(12) United States Patent
Uemura et al.

(10) Patent No.: US 9,181,439 B2
(45) Date of Patent: Nov. 10, 2015

(54) COATING LIQUID, CONDUCTIVE COATING FILM, ELECTRODE PLATE FOR ELECTRICITY STORAGE DEVICE, AND ELECTRICITY STORAGE DEVICE

(71) Applicants: Kyoritsu Chemical & Co., Ltd., Tokyo (JP); Dainichiseika Color & Chemicals Mfg. Co., Ltd., Tokyo (JP)

(72) Inventors: Taichi Uemura, Kisarazu (JP); Nobuyuki Kobayashi, Tokyo (JP); Takanori Sannan, Tokyo (JP); Shinya Tsuchida, Tokyo (JP); Seiji Doi, Tokyo (JP); Yosuke Ichinomiya, Tokyo (JP); Yoshihiko Iijima, Tokyo (JP)

(73) Assignees: Kyoritsu Chemical & Co., Ltd., Tokyo (JP); Dainichiseika Color & Chemicals Mfg. Co., Ltd., Tokyo (JP)

( * ) Notice: Subject to any disclaimer, the term of this patent is extended or adjusted under 35 U.S.C. 154(b) by 344 days.

(21) Appl. No.: 13/767,174

(22) Filed: Feb. 14, 2013

(65) Prior Publication Data

US 2013/0157129 A1 Jun. 20, 2013

Related U.S. Application Data

(63) Continuation of application No. PCT/JP2011/069785, filed on Aug. 31, 2011.

(30) Foreign Application Priority Data

Aug. 31, 2010 (JP) ................ 2010-193498

(51) Int. Cl.
C09D 5/24 (2006.01)
H01M 4/62 (2006.01)
H01G 11/28 (2013.01)
H01G 11/04 (2013.01)

(52) U.S. Cl.
CPC .................. *C09D 5/24* (2013.01); *H01G 11/04* (2013.01); *H01G 11/28* (2013.01); *H01M 4/622* (2013.01)

(58) Field of Classification Search
CPC ......... C09D 5/24; H01G 11/28; H01G 11/04; H01M 4/622
USPC .................................. 429/211, 217
See application file for complete search history.

(56) References Cited

U.S. PATENT DOCUMENTS

| | | | |
|---|---|---|---|
| 3,729,438 A | 4/1973 | Plesich et al. | |
| 5,589,297 A | 12/1996 | Koga et al. | |
| 6,917,094 B2 | 7/2005 | Murakami et al. | |
| 7,206,190 B2 | 4/2007 | Murakami et al. | |
| 2002/0031701 A1 | 3/2002 | Kawakami et al. | |
| 2009/0029255 A1 | 1/2009 | Ohmori | |
| 2011/0091771 A1* | 4/2011 | Sannan et al. | 429/217 |

FOREIGN PATENT DOCUMENTS

| | | |
|---|---|---|
| EP | 1 134 828 A1 | 9/2001 |
| JP | 63-121265 A1 | 5/1988 |
| JP | 01-017485 B2 | 3/1989 |
| JP | 06-283157 A1 | 10/1994 |
| JP | 07-201362 A1 | 8/1995 |
| JP | 09-097602 A1 | 4/1997 |
| JP | 09-097625 A1 | 4/1997 |
| JP | 11-144735 A1 | 5/1999 |
| JP | 11-238503 A1 | 8/1999 |
| JP | 11-297332 A1 | 10/1999 |
| JP | 3789427 B2 | 6/2006 |
| JP | 2007-226969 A1 | 9/2007 |
| JP | 2008-153053 A1 | 7/2008 |
| JP | 2010-021059 A | 1/2010 |
| JP | 2010-146726 A1 | 7/2010 |
| TW | 200410439 A | 6/2004 |
| TW | I330902 B | 9/2010 |
| WO | 00/07253 A1 | 2/2000 |
| WO | 2004/049475 A1 | 6/2004 |
| WO | 2009/147989 A1 | 12/2009 |

OTHER PUBLICATIONS

International Search Report dated Nov. 15, 2011 (with English translation).
Taiwanese Office Action, dated Aug. 6, 2014 (5 pages).

* cited by examiner

*Primary Examiner* — Kuo-Liang Peng
(74) *Attorney, Agent, or Firm* — Burr & Brown, PLLC

(57) ABSTRACT

A coating formulation for forming a conductive coating film on a surface of a collector for constructing an electrode plate for an electricity storage device is provided. The coating formulation contains (A) a polymeric acid, (B) a vinyl carboxylate copolymer represented by the following formula (1):

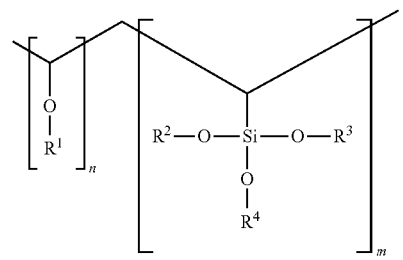

wherein $R^1$ is selected from the group consisting of H, Na, organic groups derived from vinyl carboxylate monomers, and cations capable of forming electrolytes for the electricity storage device, $R^2$ to $R^4$ are independently selected from the group consisting of H, Na, $C_1$-$C_6$ alkyl groups, and cations capable of forming electrolytes for the electricity storage device, and a ratio (m/n) of m to n is from 0.0001 to 1, (C) a conductive material, and (D) a polar solvent.

37 Claims, No Drawings

COATING LIQUID, CONDUCTIVE COATING FILM, ELECTRODE PLATE FOR ELECTRICITY STORAGE DEVICE, AND ELECTRICITY STORAGE DEVICE

BACKGROUND OF THE INVENTION

1. Field of the Invention

This invention relates to a coating formulation useful in forming a conductive coating film for its arrangement between a collector and an electrode active material layer (hereinafter also referred to as "electrode layer"), and also to a conductive coating film, a member for an electrode plate, the electrode plate for an electricity storage device, and the electricity storage device, all of which can be obtained using the coating formulation. More specifically, the present invention is concerned with a coating formulation capable of forming between a collector and an electrode layer a conductive coating film which is excellent in electrolyte resistance and oxidation resistance and can enhance the adhesion between the collector and electrode layer, and also with a conductive coating film, a member for an electrode plate, the electrode plate for an electricity storage device, and the electricity storage device, all of which can be obtained using the coating formulation.

2. Description of Related Art

A wide variety of chargeable and dischargeable batteries (storage devices) have been put to practical use as power sources for mobile equipment such as cellphones and notebook-size personal computers. Among these, commonly used are lithium ion secondary batteries which are light in weight, high in voltage and large in capacity, electric double-layer capacitors which are good in charge-discharge rate characteristics, and the like. Batteries for power applications such as vehicle-mounted batteries are, however, required to output or input a large current in a short time upon starting or stopping, so that conventional batteries are not suited for their high internal resistance and practically-insufficient charge-discharge cycle characteristics at high charge-discharge rate. Moreover, these conventional batteries are not sufficient in charge-discharge capacity from the viewpoint of cruising distances, and considering from the viewpoint of safety, are not sufficient either in the adhesion between electrode active material layers and metal collectors.

As one of reasons for which a conventional battery cannot exhibit sufficient characteristics as a battery as described above, it is possible to mention that the resistance value between its metal collector and active material layer is high and the adhesive force between its metal collector and active material layer is insufficient. As a measure for lessening these problems, a method has been proposed, which reduces the resistance at an interface between a metal collector and an active material layer and improves the adhesive force between them by providing the metal collector with a conductive coating layer (coating layer) and forming an active material layer on a surface of the coating layer (Patent Documents 1 and 2).

Especially, a method has been proposed, which uses, as a binder, a polyvinyl alcohol modified with silanol groups which chemically bond to hydroxyl groups on a surface of a metal collector as shown by the below-described equation (A) (Patent Documents 3 and 4). With this method, however, practically-sufficient charge-discharge cycle characteristics cannot be achieved at a high charge-discharge rate for batteries, which are intended for power applications, such as vehicle-mounted batteries. In particular, this method is insufficient for the prevention of deteriorations in battery characteristics when a long-term charge-discharge cycle test or high-temperature shelf test is conducted.

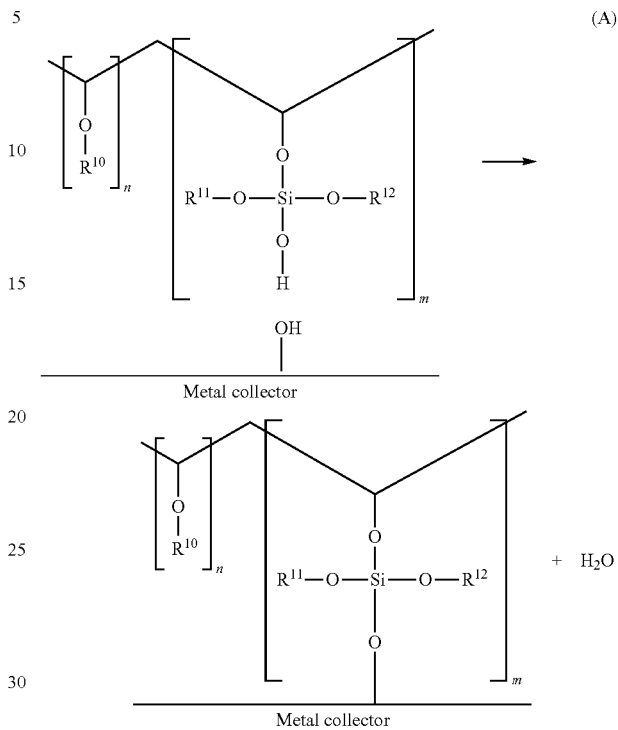

wherein $R^{10}$ represents H or —$COCH_3$, and $R^{11}$ and $R^{12}$ represent H or an ethyl group.

A method has also been proposed, which coats a conductive composition after treating a surface of a collector beforehand with a silane coupling agent or the like (Patent Document 5). The use of this method is, however, accompanied by a problem in that the resulting battery is provided with an increased internal resistance value, and hence, with a lowered charge/discharge rate because an active material layer is formed via an insulating layer although the insulation layer is thin.

To cope with these problems, a method has been proposed, which uses a conductive composition containing polyvinyl alcohol, a silane coupling agent, a polycarboxylic acid capable of forming ester bonds with hydroxyl groups on a metal surface of a collector and those of the polyvinyl alcohol and with silanol groups of the silane coupling agent, and a conductive aid (Patent Document 6). This method which makes use of the polycarboxylic acid can further improve the adhesive force of an active material layer to the collector, and therefore, can further improve the charge-discharge characteristics at a high charge-discharge rate over the conventional method which uses polyvinyl alcohol alone or the conventional method which uses a silanol-modified polyvinyl alcohol. This method is, however, not sufficient in avoiding deteriorations of battery characteristics after the battery is charged and discharged in multiple cycles over a long term or is left over in a charged state at high temperatures.

Further, positive electrode plates in a lithium ion secondary battery are placed under extremely strong acidic conditions. On the other hand, its negative electrode plates are placed under extremely strong reducing conditions. Concerning the coating films to be formed on the surfaces of its collectors, deteriorations and breakages caused by these severe conditions have, therefore, also arisen as problems. There is, hence, an outstanding desire for the development of coating films equipped with high oxidation resistance.

Furthermore, the conventional batteries and capacitors are also accompanied by the problems of the adhesion failure between electrode layers and collectors (substrates) and the high resistances at the interfaces between electrode layers and substrates as described above. Various coating formulations have been proposed. Conductive coating films formed with these coating formulations may bring about improvements in adhesion failure, but are still insufficient in electrolyte resistance and oxidation resistance. It is, therefore, the current situation that the resistances between electrode layers and collectors have increased further and the problems have not been resolved.

PRIOR ART DOCUMENTS

Patent Documents

Patent Document 1: JP-A-63-121265
Patent Document 2: JP-A-γ-201362
Patent Document 3: JP-B-3789427
Patent Document 4: WO-A-2009/147989
Patent Document 5: JP-A-2008-153053
Patent Document 6: JP-A-2010-146726
Patent Document 7: JP-B-1-17485

SUMMARY OF THE INVENTION

With the foregoing problems of the conventional technologies in view, an object of the present invention is to provide a coating formulation capable of forming a conductive electrode film, which is excellent in electrolyte resistance and oxidation resistance, has high adhesiveness to a collector such as an aluminum foil or copper foil, and is low in surface resistivity.

Other objects of the present invention are to provide a conductive coating film, which is excellent in electrolyte resistance and oxidation resistance, has high adhesiveness to a collector such as an aluminum foil or copper foil, and is low in surface resistivity, and a member for an electrode plate, said member being provided with the conductive coating film, the electrode plate for an electricity storage device, and a process for producing the electrode plate for the electricity storage device.

A still further object of the present invention is to provide an electricity storage device having characteristics such as excellent charge-discharge efficiency (cycle characteristics), large discharge capacity and low internal resistance.

Means for Solving the Problem

The occurrence of deteriorations in battery characteristics has been found to be attributable to the possession of a structure, in which the hydrogen atoms of hydroxyl groups in polyvinyl alcohol have been substituted by Si, by conventional binders. Described specifically, it has been found that, because the structure (siloxane bonds), in which the hydrogen atoms of hydroxyl groups in polyvinyl alcohol have been substituted by Si, is electrochemically cleaved with ease as described by the below-described equation (B), coating layers readily peel off upon charging and discharging to cause deteriorations in battery characteristics.

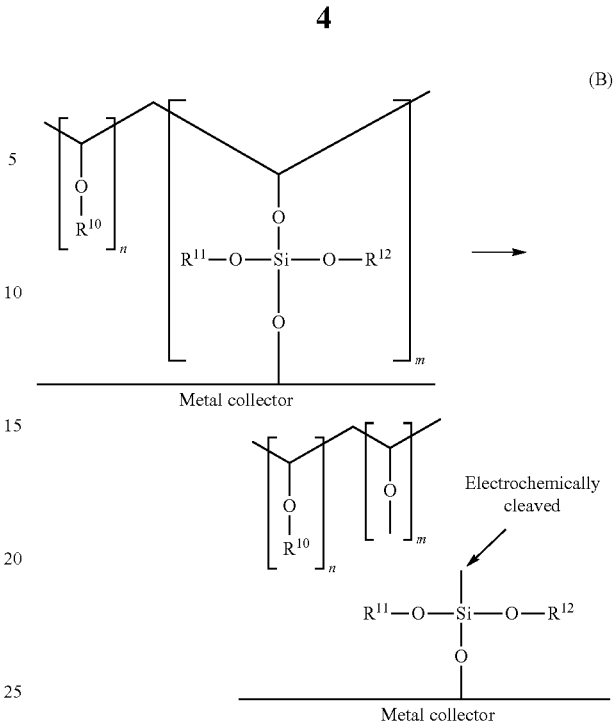

The present inventors found that the above-described objects can be achieved by using a coating formulation containing a vinyl carboxylate copolymer with Si directly bonded to backbone carbon atoms of the vinyl carboxylate copolymer, a polymeric acid, a conductive material, and a polar solvent, leading to the completion of the present invention.

Specifically, the following coating formulations are provided according to the present invention.

According to one aspect of the present invention, a coating formulation useful in forming a conductive coating film on a surface of a collector for constructing an electrode plate for an electricity storage device is provided, comprising (A) a polymeric acid, (B) a vinyl carboxylate copolymer represented by the following formula (1):

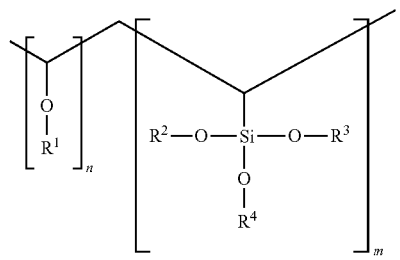

wherein $R^1$ is selected from the group consisting of H, Na, organic groups derived from vinyl carboxylate monomers, and cations capable of forming electrolytes for the electricity storage device, $R^2$ to $R^4$ are independently selected from the group consisting of H, Na, $C_1$-$C_6$ alkyl groups, and cations capable of forming electrolytes for the electricity storage device, and a ratio (m/n) of m to n is from 0.0001 to 1, (C) a conductive material, and (D) a polar solvent.

According to a second aspect of the present invention, the coating formulation as described above in the first aspect is provided, wherein the cation is a lithium or tetraalkylammonium ion.

According to a third aspect of the present invention, the coating formulation as described above in the first or second aspects is provided, further comprising a titanium-based coupling agent and/or a silane coupling agent.

According to a fourth aspect of the present invention, the coating formulation as described above in any one of the first to third aspects is provided, wherein the polymeric acid comprises at least one polymeric acid selected from the group consisting of polyacrylic acid, polyitaconic acid, and polymaleic acid.

According to a fifth aspect of the present invention, the coating formulation as described above in any one of the first to fourth aspects is provided, wherein the conductive material comprises at least one conductive material selected from the group consisting of acetylene black, Ketjenblack, graphite, furnace black, monolayer and multilayer carbon nanofibers, and monolayer and multilayer carbon nanotubes.

According to a sixth aspect of the present invention, the coating formulation as described above in any one of the first to fifth aspects is provided, wherein a content of the polymeric acid per part by mass of the conductive material is from 0.1 to 3 parts by mass, a content of the vinyl carboxylate copolymer per part by mass of the conductive material is from 0.1 to 3 parts by mass, and a solids concentration is from 0.02 to 40 mass %.

According to a seventh aspect of the present invention, the coating formulation as described above in any one of the first to sixth aspects is provided, wherein a content of the vinyl carboxylate copolymer per part by mass of the polymeric acid is from 0.1 to 1 parts by mass.

According to an eighth aspect of the present invention, the coating formulation as described above in any one of the first to seventh aspects is provided, further comprising a crosslinking agent.

According to the present invention, the following conductive coating films are provided.

According to a ninth aspect of the present invention, a conductive coating film formed from the coating formulation as described above in any one of the first to eighth aspects is provided.

According to a tenth aspect of the present invention, the conductive coating film as described above in the ninth aspect is provided, wherein the film formed from the coating formulation has been formed through heat treatment at from 80 to 250° C., and has a dry film thickness of from 0.1 to 10 µm.

According to an eleventh aspect of the present invention, the conductive coating film as described above in the ninth or tenth aspects is provided, which has a surface resistivity of not higher than 3,000Ω/☐ as measured following JIS K 7194 when formed with a dry film thickness of 4 µm on a glass plate.

According to the present invention, a member for an electrode plate is provided, comprising a collector and the conductive coating film as described above in any one of the ninth to eleventh aspects and as arranged on a surface of the collector.

According to the present invention, the following electrode plates for electricity storage devices and the following processes of the electrode plates are provided.

An electrode plate for an electricity storage device, comprising the member as described above in the twelfth aspect and an electrode active material layer arranged on a surface of the conductive coating film is provided.

The electrode plate as described above in the thirteenth aspect, wherein the collector is an aluminum foil, and a positive-electrode active material is contained in the electrode active material layer is provided.

The electrode plate as described above in the thirteenth aspect, wherein the collector is a copper foil, and a negative-electrode active material is contained in the electrode active material layer is provided.

The electrode plate as described above in the thirteenth aspect, wherein the collector is an aluminum foil, and the electrode plate is a polarizable electrode plate is provided.

According to a seventeenth aspect of the present invention, a process for producing an electrode plate for an electricity storage device, comprising the following steps applying the coating formulation as described above in any one of the first to eighth aspects onto a surface of a collector to form a conductive coating film, and forming an electrode active material layer on a surface of the conductive coating film.

According to an eighteenth aspect of the present invention, the process as described above in the seventeenth aspect is provided, wherein after applying the coating formulation onto the surface of the collector, the polar solvent contained in the coating formulation is removed under heat or heat treatment is conducted at from 80 to 250° C. for from 1 second to 60 minutes while removing the polar solvent.

According to the present invention, the following electricity storage devices are also provided.

An electricity storage device comprising the electrode plate as described above in any one of the thirteenth to sixteenth aspects is provided.

The electricity storage device as described above in the nineteenth aspect, which is a secondary cell or a capacitor is provided.

Advantageous Effects of the Invention

The coating formulation according to the present invention is high in the adhesive force to a collector because the silicon atoms of the vinyl carboxylate copolymer substitute for active hydrogen atoms existing on a surface of the collector to form chemical bonds. Further, an electrically-stable conductive coating film can be formed as [—C—O—Si—] bond structures prone to electrochemical degradation are not formed on the backbone. Therefore, the use of the coating formulation according to the present invention can form a conductive electrode film as an undercoat layer, which is excellent in electrolyte resistance and oxidation resistance, has high adhesiveness to a collector such as an aluminum foil or copper foil and is low in surface resistivity, between a collector and an electrode layer that make up an electrode plate for an electricity storage device. As a result, the electrode layer excellent in adhesiveness, oxidation resistance, electrolyte resistance and the like can provide a member for an electrode plate, said member being arranged on the surface of the collector such as the aluminum foil or copper foil. In addition, the contact resistance between the collector and the electrode layer is improved, thereby making it possible to provide an electrode plate of excellent characteristics for an electricity storage device, such as an electrode plate for a cell or a polarizable electrode plate for a capacitor.

Moreover, the use of the coating formulation according to the present invention can form a conductive coating film having a stronger adhesive force than conventional conductive coating layers. Therefore, conductive chips are hardly formed upon slitting the electrode, thereby making it possible to avoid any trouble resulting from short-circuiting during use.

DETAILED DESCRIPTION OF THE INVENTION (1) Coating Formulation

The coating formulation according to the present invention is useful in forming a conductive coating film on a surface of a collector for constructing an electrode plate for an electricity storage device. Contained in the coating formulation according to the present invention are (A) a polymeric acid, (B) a vinyl carboxylate copolymer represented by the below-described formula (1), (C) a conductive material, and (D) a polar solvent. A description will hereinafter be made about details of the coating formulation.

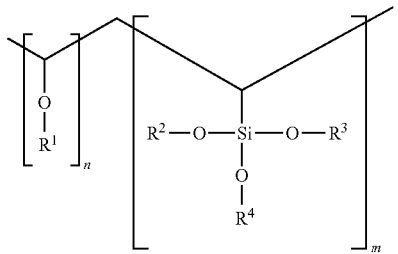

wherein $R^1$ is selected from the group consisting of H, Na, organic groups derived from vinyl carboxylate monomers, and cations capable of forming electrolytes for the electricity storage device, $R^2$ to $R^4$ are independently selected from the group consisting of H, Na, $C_1$-$C_6$ alkyl groups, and cations capable of forming electrolytes for the electricity storage device, and a ratio (m/n) of m to n is from 0.0001 to 1, Polymeric Acid In the coating formulation according to the present invention, the polymeric acid is contained. The term "polymeric acid" as used herein means a polymer having plural acidic groups such as carboxyl groups or phosphoric groups, or a polymer formed by polymerization of plural carboxylic acid compounds or phosphoric acid compounds. It is to be noted that its acidic groups may be in a free acid form or in a salt form. It is also to be noted that the polymeric acid may be a homopolymer or a copolymer. The polymeric acid contained in the coating formulation according to the present invention is a component that has a function as a crosslinking agent to crosslink and cure the vinyl carboxylate copolymer to be described subsequently herein.

As the polymeric acid, homopolymers of carboxyl-containing vinyl monomers and copolymers of carboxyl-containing vinyl monomers and carboxyl-free vinyl monomers are preferred. More preferred polymeric acids include homopolymers of phthalocyanine polycarboxylic acid, phytic acid, hexametaphosphoric acid, polyphosphoric acid, acrylic acid, methacrylic acid, itaconic acid, maleic acid and the like, and their copolymers; and styrene-maleic acid copolymer, isobutylene-maleic acid copolymer, vinyl ether-maleic acid copolymer, pectic acid, polyglutamic acid, polymalic acid, polyaspartic acid, acrylic acid-maleic acid-vinyl alcohol copolymer, and the like. Of these, polyacrylic acid, polyitaconic acid and polymaleric acid are particularly preferred. Commercial products of polyacrylic acid include, in addition to "JURYMER AQUEOUS SOLUTION AC-10S" (trade name, average molecular weight (Mw): 5,000), "JURYMER AQUEOUS SOLUTION AC-10L" (trade name), "JURYMER AQUEOUS SOLUTION AC-10H" (trade name) and "JURYMER AQUEOUS SOLUTION 10SH" (trade name, average molecular weight (Mw): 20,000 to 1,000,000), all of which are products of Toagosei Co., Ltd., and the like. These polyacrylic acids may be used either singly, or in consideration of, for example, viscosity or the like, as a combination of two or more thereof.

(Vinyl Carboxylate Copolymer)

In the coating formulation according to the present invention, the vinyl carboxylate copolymer represented by the formula (1) is contained. It is to be noted that $R^1$ in the formula (1) is selected from the group consisting of H, Na, organic groups derived from vinyl carboxylate monomers, and cations capable of forming electrolytes for the electricity storage device.

The organic groups derived from the vinyl carboxylate monomers are organic groups derived from vinyl carboxylate monomers as raw materials for the vinyl carboxylate copolymers, and are organic groups formed by eliminating a carbonyloxy group from the carboxylic acid moieties of the vinyl carboxylate monomers. Examples of the vinyl carboxylate monomers include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, and vinyl cinnamate. Therefore, the organic groups derived from the vinyl carboxylate monomers can be $C_1$-$C_{17}$ linear or branched alkyl groups (for example, methyl, ethyl, propyl, pentyl, heptyl, nonyl, undecanyl, tridecanyl, pentadecanyl, heptadecanyl, monochloromethyl, 1-ethyl-pentyl), $C_3$-$C_6$ cycloalkyl groups (for example, cyclohexyl, cyclopentyl), and aromatic groups (for example, phenyl), all of which may be substituted by one or more halogen atoms.

The cations capable of forming the electrolytes for the electricity storage device are as will be mentioned subsequently herein, and illustrative are a lithium ion and tetraalkylammonium ions such as tetraethylammonium and triethylmethylammonium ions.

As $R^1$, H, Na or a cation capable of forming an electrolyte for the electricity storage device is preferred, with the cation capable of forming an electrolyte for the electricity storage device (especially, a lithium ion) being more preferred. As $R^1$, the proportion of organic groups derived from a vinyl carboxylate monomer may account preferably for 30% or less (in other words, 70% or more in terms of saponification degree), more preferably for 20% or less (in other words, 80% or more in terms of saponification degree), particularly preferably for 10% or less (in other words, 90% or more in terms of saponification degree).

In the formula (1), $R^2$-$R^4$ are independently selected from the group consisting of H, Na, $C_1$-$C_6$ alkyl groups, and cations capable of forming electrolytes for the electricity storage device.

The $C_1$-$C_6$ alkyl groups in $R^2$-$R^4$ are linear and branched, $C_1$-$C_6$ alkyl groups, and illustrative are methyl, ethyl, n-propyl and n-butyl, with ethyl being preferred.

In $R^2$-$R^4$ and the above-mentioned $R^1$ in the formula (1), the cation capable of forming the electrolyte for the electricity storage device can be a cation of any electrolyte insofar as it can be used as an electrolyte for an electricity storage device such as a secondary cell or capacitor. Of these, particularly preferred is a cation of an electrolyte for an electricity storage device which is manufactured by using the coating formulation according to the present invention. The cation may be, for example, a lithium ion in the case of a lithium ion secondary cell, or a tetraalkylammonium ion in the case of an electric double-layer capacitor. Further, the cation may be a tetraethylammonium ion in the case of an electric double-layer capacitor making use of tetraethylammonium tetrafluoroborate, or a triethylmethylammonium ion in the case of an electric double-layer capacitor making use of triethylmethylammonium bis(trifluoromethanesulfonyl)imide.

As $R^2$ to $R^4$ in the formula (1), Na or a cation capable of forming an electrolyte for the electricity storage device is preferred, with the cation capable of forming the electrolyte for the electricity storage device (especially, a lithium ion) being more preferred.

It is preferred that at least one of $R^1$ to $R^4$ in the formula (1) is a cation capable of forming an electrolyte for the electricity storage device. Assuming that the rate of substitution is 100% when all of $R^1$ to $R^4$ in the formula (1) have been substituted by the above-described cations, the rate of substitution by 1 to 4 cations may be preferably 5% or more, more preferably 20% or more from the viewpoint of battery capacity and life. As cations other than a lithium ion, alkali metal ions such as Na and K and alkaline earth metal ions such as Be, Mg, Ca and Sr can be exemplified.

The ratio (m/n) of m to n in the formula (1) may be preferably from 0.0001 to 1, more preferably from 0.005 to 0.5, especially preferably from 0.01 to 0.1.

In the formula (1), m may be preferably from 1 to 10,000, more preferably from 5 to 1,000, especially preferably from 10 to 500.

In the formula (1), n may be preferably from 20 to 100,000, more preferably from 200 to 20,000, especially preferably from 300 to 1,000.

As the vinyl carboxylate copolymer, a copolymer obtained by reacting vinyl acetate and vinyltriethoxysilane can be exemplified ($R^1$: methyl; $R^2$ to $R^4$: ethyl). Vinyl acetate moieties in the copolymer can be saponified to hydroxyl groups ($R^1$ and $R^2$ to $R^4$: H). From the viewpoint of electrolyte resistance, the degree of saponification may be preferably 50% or higher, more preferably 80% or higher, particularly preferably 90% or higher. It is preferred to introduce Na or a cation, which is capable of forming an electrolyte for the electricity storage device, to $R^1$ and $R^2$ to $R^4$ in a hydrolyzed vinyl carboxylate copolymer.

As vinyl carboxylate compounds usable, in addition to vinyl acetate, in the above-described reaction, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinylpivalate, vinyloctylate, vinyl monochloroacetate, vinyl adipate, vinyl methacrylate, vinyl crotonate, vinyl sorbate, vin benzoate, vinyl cinnamate, and the like can be exemplified. Vinyl acetate is preferred from the viewpoint of price and availability. As silane compounds usable in addition to vinyltriethoxysilane, vinyltrimethoxysilane, vinyltripropoxysilane, vinyltributoxysilane and the like can be exemplified. Vinyltriethoxysilane is preferred from the viewpoint of price and availability.

The coating formulation according to the present invention contains, as a binder, the vinyl carboxylate copolymer having silanol groups which chemically bond to hydroxyl groups present on the metal surface, and therefore, can form a conductive coating film having a high adhesive force to the metal-made collector. Further, silicon atoms are directly bonded to backbone carbons of the vinyl carboxylate copolymer. Accordingly, the formed conductive coating film is also hardly degradable electrochemically.

When the hydrogen atoms of silanol groups are substituted by Na or cations, which can form an electrolyte for the electricity storage device, in the coating formulation according to the present invention, the silanol groups do not undergo mutual condensation to result in thickening or the resulting conductive coating film is not reduced in adhesive force, during stage. As sodium hydroxide is used upon saponification of the vinyl acetate moieties, $R^1$ to $R^4$ in the formula (1) are substituted by Na (Patent Document 7). However, Na ions may interfere with an ionic conduction upon charging or discharging the battery, or may lead to deteriorations in battery characteristics. It is, therefore, more preferred that $R^1$ to $R^4$ in the formula (1) are substituted by cations of the electrolyte.

When $R^1$ to $R^4$ in the formula (1) are lithium (Li) atoms, the coating formulation according to the present invention is preferred as a coating formulation useful for a collector in a lithium ion secondary cell. In such a coating formulation, at least some of the hydrogen atoms of silanol groups and hydroxyl groups have been substituted by lithium atoms. The resulting conductive coating film can, therefore, act as an ion source for the depletion of lithium ions due to deteriorations caused by the mutual condensation of silanol groups or a parasitic capacitance when the conductive coating film is assembled in a lithium ion secondary cell and the lithium ion secondary cell is charged and discharged, and the coating formulation according to the present invention can contribute to improvements in charge and discharge capacity.

(Conductive Material)

A conductive material is contained in the coating formulation according to the present invention. The use of the conductive material provides the resulting conductive coating film with substantially-improved electrical contact properties. It is, therefore, possible to manufacture an electricity storage device, which is low in internal resistance and high in capacity density. The conductive material can be conductive particles or a conductive filler, or a liquid having ionic properties.

Examples of the conductive particles or conductive filler include metal powders, flakes and colloids of Ag, Cu, Au, Al, Mg, Rh, W, Mo, Co, Ni, Pt, Pd, Cr, Ta, Pb, V, Zr, Ti, In, Fe, Zn, and the like; Sn—Pb, Sn—In, Sn—Bi, Sn—Ag and Sn—Zn alloy powders and flakes; conductive carbon-based materials such as acetylene black, Ketjenblack, graphite, furnace black, monolayer or multilayer carbon nanofibers, and monolayer or multilayer carbon nanotubes; metal oxide-based, conductive fillers, which are selected from zinc oxide, tin oxide, indium oxide, titanium oxides (titanium dioxide, titanium monoxide and the like) and the like, have surplus electrons produced by the existence of lattice defects, and exhibit electrical conductivity; and the like. These conductive particles and fillers can be used either singly or as a combination of two or more thereof. It is also preferred to use these conductive particles and fillers after treating their surfaces with a coupling agent or the like. From the viewpoint of electrical conductivity and liquid properties, the size of particles may be preferably in a range of from 0.001 to 100 μm, more preferably in a range of from 0.01 to 10 μm.

The liquid having ionic properties can be a liquid with ions dissolved therein or an ionic liquid. As the ions in the liquid with the ions dissolved therein, sodium chloride, potassium chloride, lithium chloride or the like can be exemplified when the solvent is water. Lithium hexafluorophosphate can be exemplified when the solvent is an organic material such as dimethyl carbonate. Specific examples of the ionic liquid include imidazolium salt derivatives such as 1,3-dimethylimidazolium methylsulfate, 1-ethyl-3-methylimidazolium bis(pentafluoroethylsulfonyl)imide and 1-ethyl-3-methylimidazolium bromide; pyridinium salt derivatives such as 3-methyl-1-propylpyridinium bis(trifluoromethylsulfonyl)imide and 1-butyl-3-methylpyridinium bis(trifluoromethylsulfonyl)imide; alkylammonium derivatives such as tetrabutylammonium heptadecafluorooctanesulfonate and tetraphenylammonium methanesulfonate; phosphonium salt derivatives such as tetrabutylphosphonium methanesulfonate; and the like. These liquids having ionic properties may be used in combination with conductive particles or a conductive filler.

(Polar Solvent)

A polar solvent is contained in the coating formulation according to the present invention. As the polar solvent, one or more of conventionally-known ones can be used. Specific examples of the polar solvent include water: alcohols such as methyl alcohol, ethyl alcohol, propyl alcohol and butyl alcohol; carbonates such as ethylene carbonate, ethyl methyl carbonate, diethyl carbonate, dimethyl carbonate, propylene carbonate and butylene carbonate; amides such as formamide, N-methyl formamide, N-ethyl formamide, N,N-dimethyl formamide, N,N-diethyl formamide, vinyl formamide, vinyl acetamide, acetamide, N-methyl acetamide, N-ethyl acetamide, N,N-dimethyl acetamide, N,N-diethyl acetamide, N-methyl-2-pyrrolidone, N-ethyl-2-pyrrolidone, vinylpyrrolidone, piperidone, N-methyl piperidone, N-ethyl piperidone, hexamethyl phosphoric triamide, 1,3-dimethyl-2-imidazolidinone, methyloxazolidinone and ethyloxazolidinone; sulfoxides such as dimethyl sulfoxide; sulfones such as tetramethylene sulfone; and the like.

Of these, more preferred are water, methyl alcohol, ethyl alcohol, isopropyl alcohol, N,N-dimethyl formamide, N,N-dimethyl acetamide, N-methyl-2-pyrrolidone, N-ethyl-2-pyrrolidone, 1,3-dimethyl-2-imidazolidinone and dimethyl sulfoxide. These polar solvents may be used either singly or as a combination of two or more thereof. As these polar solvents, commercial products may be used as they are, or may be used after purification as needed.

(Composition)

The amount of the vinyl carboxylate copolymer contained in the coating formulation according to the present invention may be preferably from 0.1 to 3 parts by mass, more preferably from 0.3 to 2 parts by mass when the conductive material is assumed to amount to 1 parts by mass. On the other hand, the amount of the polymeric acid contained in the coating formulation according to the present invention may be preferably from 0.1 to 3 parts by mass, more preferably from 0.3 to 2 parts by mass when the conductive material is assumed to amount to 1 parts by mass. Further, the solids concentration of the coating formulation may be preferably from 0.02 to 40 mass %, more preferably from 0.02 to 35 mass %, particularly preferably from 0.1 to 35 mass % when the whole coating formulation is assumed to amount to 100 mass %.

The content of the vinyl carboxylate copolymer may be preferably from 1 to 40 parts by mass, more preferably from 1 to 20 parts by mass, particularly preferably from 1 to 10 parts by mass when the whole coating formulation is assumed to amount to 100 parts by mass. The content of the polymeric acid may be preferably from 1 to 40 parts by mass, more preferably from 1 to 20 parts by mass when the whole coating formulation is assumed to amount to 100 parts by mass. Further, the content of the conductive material may be preferably from 0.1 to 30 parts by mass, more preferably from 0.1 to 20 parts by mass, particularly preferably from 2 to 15 parts by mass when the whole coating formulation is assumed to amount to 100 parts by mass.

An excessive low content of the vinyl carboxylate copolymer or polymeric acid may provide the resulting conductive coating film with insufficient strength, insufficient adhesiveness the collector, and insufficient electrolyte resistance. On the other hand, an unduly high content of the vinyl carboxylate copolymer or polymeric acid may make it difficult to obtain a uniform coating formulation. An excessively low content of the conductive material may provide the resulting conductive coating film with insufficient conductivity. On the other hand, an unduly high content of the conductive material comparatively results in insufficient contents of the remaining components, and therefore, may provide the resulting conductive coating film with reduced performance.

The content of the vinyl carboxylate copolymer per mass parts of the polymeric acid may be preferably from 0.1 to 1 parts by mass. If the content of the vinyl carboxylate copolymer per mass parts of the polymeric acid is lower than 0.1 parts by mass, the resulting conductive coating film may be provided with reduced electrolyte resistance. If the content of the vinyl carboxylate copolymer per mass parts of the polymeric acid is higher than 1 parts by mass, on the other hand, the resulting conductive coating film may be provided with reduced oxidation resistance.

(Coupling Agent)

The coating formulation according to the present invention may further contain a coupling agent. As the coupling agent, a silane coupling agent or titanium-based coupling agent is preferred. Specific examples of the silane coupling agent include vinyltrimethoxysilane, vinyltriethoxysilane, γ-chloropropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, β-glycidoxypropylmethyldimethoxysilane, γ-methacryloxypropyltrimethoxysilane, γ-methacryloxypropylmethyldimethoxysilane, γ-mercaptopropyltrimethoxysilane, and the like. As an example of a fluorinated silane coupling agent, (tridecafluoro-1,1,2,2-tetrahydrooctyl)triethoxysilane can be mentioned. As an example of an epoxy-modified silane coupling agent, a coupling agent produced by Shin-Etsu Chemical Co., Ltd. ("KBM-403", trade name) can be mentioned. Further, as an example of an oxetane-modified silane coupling agent, a coupling agent produced by Toagosei Co., Ltd. ("TESOX", trade name) can be mentioned.

Specific examples of the titanium-based coupling agent include triethanolamine titanate, titanium acetylacetonate, titanium ethylacetoacetate, titanium lactate, ammonium titanium lactate, tetrastearyl titanate, isopropyltricumylphenyl titanate, isopropyltri(N-aminoethyl-aminoethyl) titanate, dicumylphenoloxyacetate titanate, isopropyltrioctanoyl titanate, isopropyldimethacrylisostearoyl titanate, titanium ethyl lactate, octylene glycol titanate, isopropyl triisostearoyl titanate, triisostearyl isopropyl titanate, isopropyl tridodecylbenzenesulfonyl titanate, tetra(2-ethylhexyl) titanate, butyl titanate dimer, isopropyl isostearoyl diacryl titanate, isopropyl tri(dioctylphosphate) titanate, isopropyl tris(dioctylpvrophosphate) titanate, tetraisopropyl bis(dioctylphosphite) titanate, tetraoctyl bis(ditridecylphosphite) titanate, tetra(2,2-diallyloxymethyl-1-butyl)bis(di-tridecyl)phosphite titanate, bis(dioctylpyrophosphate)oxyacetate titanate, bis(dioctylpyrophosphate)ethylene titanate, tetra-1-propyl titanate, tetra-n-butyl titanate, diisostearoyl ethylene titanate, and the like.

These coupling agents can be used either singly or as a combination of two or more thereof. The addition of the coupling agent to the coating formulation makes it possible to react the coupling agent with a hydrogen-bonding functional group of a component contained in the coating formulation, and hence, to further improve the crosslink density. As a consequence, the mutual substitution reaction between an element making up an active material and an element making up a collector can be inhibited further. In particular, the occurrence of a crosslinking reaction with a titanium-based coupling agent or silane coupling agent makes it possible to improve the crosslinking rate or to improve adhesive force, strength and electrochemical durability. Further, the use of a coupling agent by its addition to the coating formulation makes it possible to avoid the formation of an excessively-insulating, modified layer at an interface and also to inhibit an increase in interface resistance.

The amount of the coupling agent to be contained in the coating formulation may be preferably from 0.01 to 20 parts by mass, more preferably from 0.1 to 10 parts by mass, particularly preferably from 0.3 to 3 parts by mass per 100 parts by mass of the vinyl carboxylate copolymer.

(Crosslinking Agent)

In the coating formulation according to the present invention, a crosslinking agent other than the above-mentioned polymeric acid may be contained. The incorporation of the crosslinking agent makes it possible to provide the resulting coating film with enhanced strength. Specific examples of the crosslinking agent include organic acids existing in the nature, such as succinic acid and citric acid; polybasic acids such as butanetetracarboxylic acid, phosphonobutanetricarboxylic acid, pyromellitic acid and trimellitic acid; epoxy compounds such as ethylene glycol diglycidyl ether, polyethylene glycol diglycidyl ether and glycerol polyglycidyl ether; isocyanate compounds such as toluoylene diisocyanate, xylylene diisocyanate, hexamethylene diisocyanate and phenyl diisocyanate; blocked isocyanate compounds formed by blocking such isocyanate compounds with blocking agents such as phenols, alcohols, active methylenes, mercaptans, acid-amides, imides, amines, imidazoles, ureas, carbamic acids, imines, oximes or sulfites; and aldehyde compounds such as glyoxal, glutaraldehyde and dialdehyde starch.

Further specific examples of the crosslinking agent include (meth)acrylate compounds such as polyethylene glycol diacrylate, polyethylene glycol dimethacrylate and hexanediol diacrylate; methylol compounds such as methylolmelamine and dimethylol urea; organic acid metal salts such as zirconyl acetate, zirconyl carbonate and titanium lactate; and metal alkoxide compounds such as aluminum trimethoxide, aluminumtributoxide, titaniumtetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate).

Still further examples of the crosslinking agent include silane compounds such as methyltrimethoxysilane, tetraethoxysilane and methyltriethoxysilane; carbodiimide compounds; and the like. When such a crosslinking agent is incorporated, the content of the crosslinking agent may be set preferably at from 0.01 to 200 mass % based on the vinyl carboxylate copolymer employed as a resin binder.

(Stabilizer)

In the coating formulation according to the present invention, a stabilizer may be further contained as needed. Specific examples of the stabilizer include phenol-based antioxidants such as 2,6-di-tert-butyl-phenol, 2,4-d-tert-butyl-phenol, 2,6-di-tert-butyl-4-ethyl-phenol and 2,4-bis(n-octylthio)-6-(4-hydroxy-3,5-di-tert-butyl-anilino)-1,3-triazine; aromatic amine-based antioxidants such as alkyldiphenylamines, N,N'-diphenyl-p-phenylenediamine, 6-ethoxy-2,2,4-trimethyl-1,2-dihydroquinoline and N-phenyl-N'-isopropyl-p-phenylenediamine; sulfide-based hydroperoxide decomposers such as dilauryl-3,3'-thiodipropionate, ditridecyl-3,3'-thiodipropionate, bis[2-methyl-4-[3-n-alkylthiopropionyloxy]-5-tert-butyl-phenyl]sulfides and 2-mercapto-5-methyl-benzoimidazole; phosphorus-based hydroperoxide decomposers such as tris(isodecyl) phosphite, phenyldiisooctyl phosphite, diphenyl isooctyl phosphite, di(nonylphenyl)pentaerythritol diphosphite, diethyl 3,5-di-tert-butyl-4-hydroxy-benzylphosphate and sodium bis(4-tert-butylphenyl)phosphate; salicylate-based light stabilizers such as phenyl salicylate and 4-tert-octylphenyl salicylate; benzophenone-based light stabilizers such as 2,4-dihydroxybenzophenone and 2-hydroxy-4-methoxybenzophenone-5-sulfonic acid; benzotriazole-based light stabilizers such as 2-(2'-hydroxy-5'-methylphenyl)benzotriazole and 2,2'-methylene bis[4-(1,1,3,3-tetramethylbutyl)-6-(2N-benzotriazol-2-yl)phenol]; hindered amine-based light stabilizers such as phenyl-4-piperidinyl carbonate and bis-[2,2,6,6-tetramethyl-4-piperidinyl]sebacate; Ni-based light stabilizers such as [2,2'-thio-bis(4-t-octylphenolate)]-2-ethylhexylamine-nickel(II); cyanoacrylate-based light stabilizers; and oxalic anilide-based light stabilizers. These stabilizers can be used either singly or as a combination of two or more thereof.

When such a stabilizer is incorporated, the content of the stabilizer may be set preferably at from 0.01 to 10 parts by mass, more preferably at from 0.05 to 5 parts by mass, particularly preferably at from 0.1 to 1 parts by mass per 100 parts by mass of the vinyl carboxylate copolymer.

(Other Resin Component)

To the coating formulation according to the present invention, resin components such as the homopolymer (polyvinylpyrrolidone) obtained from vinylpyrrolidone as a constituent monomer, copolymers obtained from vinylpyrrolidone as an essential constituent monomer, chitosan, and derivatives thereof can be added. These resin components can be used either singly or as a combination of two or more thereof. The incorporation of such a resin component in the coating formulation provides the conductive material with improved dispersibility in the coating formulation. Moreover, such a resin component functions as a film-forming component, and hence, can provide the resulting conductive coating film with still better characteristics.

(Surfactant)

In the coating formulation according to the present invention, one or more of various surfactants may be incorporated to adjust its wetness. As the surfactants, anionic surfactants, amphoteric surfactants and nonionic surfactants can be used.

Specific examples of the anionic surfactants include soap, lauryl sulfates, polyoxyethylene alkyl ether sulfates, alkylbenzene sulfonates, polyoxyethylene alkyl ether phosphates, polyoxyethylene alkyl phenyl ether phosphates, N-acyl amino acid salts, α-olefin sulfonate salts, alkyl sulfate ester salts, alkyl phenyl ether sulfate ester salts and methyl taurine acid salts. Specific examples of the amphoteric surfactants include alkyldiaminoethylglycine hydrochlorides, 2-alkyl-N-carboxymethyl-N-hydroxyethyl imidazolinium betaines, lauryl dimethylaminoacetic acid betaine, coconut fatty acid amidopropylbetaine, fatty acid alkylbetaines, sulfobetaine and amine oxides. Further, specific examples of the nonionic surfactants include alkyl ester compounds of polyethylene glycol, alkyl ether compounds such as triethylene glycol monobutyl ether, ester compounds such as polyoxysorbitan ester, alkylphenol compounds, fluorine-containing compounds, and silicone compounds. These surfactants can be used either singly or as a combination of two or more thereof.

When such a surfactant is incorporated, the content of the surfactant may be preferably from 0.01 to 50 parts by mass, more preferably from 0.1 to 20 parts by mass, particularly preferably from 1 to 10 parts by mass per 100 parts by mass of the vinyl carboxylate copolymer.

(Insulating Filler)

In the coating formulation according to the present invention, one or more of various insulating fillers may be incorporated, as needed, to an extent not impairing the conductivity of the resulting coating formulation in order to provide the resulting conductive coating film with improved mechanical strength and thermal characteristics. Specific examples of the insulating fillers include powders of metal oxides such as alumina, silica, zirconia and titania; sols such as colloidal silica, titania sol and alumina sol; clay minerals such as talc, kaolinite and smectite; carbides such as silicon carbide and titanium carbide; nitrides such as silicon nitride, aluminum nitride and titanium nitride; borides such as boron nitride, titanium boride and boron oxide; complex oxides such as mullite; hydroxides such as aluminum hydroxide and magnesium hydroxide; and barium titanate and the like, which can provide increased dielectric constants.

When such an insulating filler is incorporated, the content of the insulating filler may be set preferably at from 0.001 to 10 parts by mass, more preferably at from 0.01 to 5 parts by mass, particularly preferably at from 0.1 to 2 parts by mass per 100 parts by mass of the vinyl carboxylate copolymer.
(Preparation Method, etc.)

To prepare the coating formulation according to the present invention, the vinyl carboxylate copolymer as a resin binder, the conductive material, the polymeric acid, and other components, which may be used as needed, are first added to the polar solvent to give predetermined proportions, respectively. These components are then mixed and dispersed, thereby making it possible to prepare the coating formulation according to the present invention. Upon conducting the mixing and dispersion of the individual components, it is possible to use a conventionally-known disperser such as a homogenizer, bead mill, ball mill, sand mill or roll mill or a conventionally-known kneader such as a planetary mixer as needed.

As the individual components, their commercial products may be used as they are or after purification as needed. No particular limitation is imposed on the order in which the vinyl carboxylate copolymer and polymeric acid are added to the polar solvent, and therefore, either the vinyl carboxylate copolymer or the polymeric acid may be added before, or both of them may be added at the same time. Upon dissolution of the vinyl carboxylate copolymer and polymeric acid in the polar solvent, stirring may be conducted under room temperature conditions, or under heated conditions as needed. It is to be noted that they may be dissolved preferably under heating at 80° C. or higher.

The coating formulation according to the present invention may preferably be subjected to physical processing before coating by using a conventionally-known physical processing method. The physical processing method can be a processing method that makes use of, for example, a bead mill, ball mill, sand mill, pigment disperser, mix-muller, ultrasonic disperser, homogenizer, planetary mixer, Hobart mixer, or the like.

In the case of the processing method making use of the bead mill, for example, it is only necessary to fill zirconia-made beads (diameters: 0.03 to 3 mm) at a filling ratio of from 50 to 95% in a ceramic-made vessel, and then to perform dispersion processing at a rotor rim speed of from 5 to 20 m/s batchwise or in a successive cyclic manner.

The coating formulation may preferably be prepared such that the resulting conductive coating film has a surface resistivity of 3,000Ω/□ or lower. To control the surface resistivity of the conductive coating film within the above-described numerical range, it is only necessary, for example, to adjust the content of the conductive material as needed. It is to be noted that the surface resistivity of a conductive coating film can be measured by forming the conductive coating film with a dry film thickness of 4 μm on a glass plate and conducting its measurement following JIS K 7194.
(2) Conductive Coating Film, Member for Electrode Plate, and Electrode Plate for Electricity Storage Device The use of the above-mentioned coating formulation makes it possible to form the conductive coating film according to the present invention, which is useful as a component of an electrode plate for a secondary cell or capacitor. The conductive coating film can be formed, for example, by applying the coating formulation to a dry film thickness of preferably from 0.1 to 10 μm, more preferably from 0.1 to 5 μm, particularly preferably from 0.1 to 2 μm onto a surface of a collector or the like, which makes up an electrode plate of an electricity storage device, and then conducting heat treatment. It is to be noted that the conditions for the heat treatment may be set preferably at from 80 to 250° C. for from 1 second to 60 minutes. By conducting the heat treatment under such conditions as mentioned above, the vinyl carboxylate copolymer as a resin binder can be fully crosslinked, thereby making it possible to form a conductive coating film with further improved adhesiveness to the collector or the like and also with further improved electrolyte resistance.

The conductive coating film according to the present invention may have a surface resistivity of preferably 3,000Ω/□ or lower, more preferably 2,000Ω/□ or lower as measured following JIS K 7194 when it is formed with a dry film thickness of 4 μm on a glass plate. If a conductive coating film having a surface resistivity of higher than 3,000Ω/□ is applied to an electrode plate, the internal resistance increases, thereby making it difficult to obtain a high-efficiency and long-life cell or capacitor.

The surface resistivity of a conductive coating film can be measured by a method to be described hereinafter. After a coating formulation is first applied onto a glass plate, the coating formulation is subjected to heat treatment at 200° C. for 1 minute to form a conductive coating film having a dry film thickness of 4 μm. Following JIS K 7194, the surface resistivity of the resulting conductive coating film is measured by the four-point probe method. It is to be noted that for the measurement, "LORESTA-GP, MODEL: MCP-T610" (trade name, manufactured by Mitsubishi Chemical Analvtech Co., Ltd.) can be used. The measurement conditions may be set at 25° C. and 60% relative humidity.

When the conductive coating film is formed on the surface of the collector, the formation of a positive electrode layer for a cell, a negative electrode layer for the cell or a polarizable electrode layer for a capacitor on a surface of the conductive coating film makes it possible to obtain an electrode plate for an electricity storage device, which is low in the resistance between the electrode layer and the collector and is also low in environmental load.

The member according to the present invention for the electrode is provided with the collector and the above-mentioned conductive coating film arranged on the surface of the collector. On the other hand, the electrode plate according to the present invention for the electricity storage device is provided with the above-described member for the electrode plate and an electrode active material layer arranged on the surface of the conductive coating film. Described specifically, the electrode plate according to the present invention for the electricity storage device in provided, between the collector and the electrode active material layer (electrode layer), with the conductive coating film formed as an undercoat layer by using the coating formulation according to the present invention. The vinyl carboxylate copolymer as a resin binder, polymeric acid and conductive material are, therefore, contained as essential components in the conductive coating film that makes up the electrode plate for the electricity storage device.
(3) Production Process of Electrode Plate for Electricity Storage Device The process according to the present invention for the production of an electrode plate for an electricity storage device has a step (first step) of applying the above-mentioned coating formulation onto a surface of a collector to form a conductive coating film and another step (second step) of forming an electrode active material layer on a surface of the conductive coating film. Examples of the collector include positive electrode collectors formed of foils of metals such as aluminum, tantalum, niobium, titanium, hafnium, zirconium, zinc, tungsten, bismuth and antimony, and negative electrode collectors formed of foils of metals such as copper. As a positive electrode collector, an aluminum foil is preferred as it has corrosion resistance to an electrolyte, is light weight, and permits easy machining. The thickness of the metal foil (collector) may be preferably from 5 to 30 µm, more preferably from 8 to 25 µm. Such a collector may preferably be treated beforehand at a surface thereof with a coupling agent such as a silane-based, titanate-based or aluminum-based coupling agent.

In the first step, the coating formulation is applied onto the surface of the collector by one of various coating methods. The coating formulation may preferably be applied to give a dry thickness of preferably from 0.1 to 10 µm, more preferably from 0.1 to 5 µm, particularly preferably from 0.1 to 2 µm. A dry thickness of smaller than 0.1 µm may lead to a difficulty in conducting a uniform application. On the other hand, a dry thickness of greater than 10 µm may provide the resulting conductive coating film with reduced flexibility. Specific examples of the various coating methods include gravure coating, gravure reverse coating, roll coating, Meyer bar coating, blade coating, knife coating, air knife coating, comma coating, slot die coating, slide die coating, and dip coating.

The conductive coating film, which functions as an undercoat layer, can be formed, for example, when subsequent to the application of the coating formulation, the polar solvent contained in the coating formulation is removed under heat or the coating formulation is subjected to heat treatment wile removing the polar solvent. The conditions for the heat treatment may be set preferably at from 80 to 250° C., for from 1 second to 60 minutes. The heat treatment under such conditions can fully crosslink the vinyl carboxylate copolymer as a resin binder to provide the resulting conductive coating film with further improved adhesiveness to the collector and also with further improved electrolyte resistance. A heat treatment condition of lower than 80° C. or shorter than 1 second may fail to provide the resulting conductive coating film with sufficient adhesiveness to the collector and also with sufficient electrolyte resistance.

In the second step, the electrode active material layer (electrode layer) is formed on the surface of the resulting conductive coating film. As a result, the electrode plate for the electricity storage device can be obtained. To further improve the homogeneity of the electrode layer, it is preferred to subject the electrode layer to pressing processing while using metal rolls, heating rolls, a sheet press or the like. A condition for the pressing processing may be set preferably at from 500 to 7,500 kgf/cm$^2$, because a press pressure of lower than 500 kgf/cm$^2$ may have a difficulty in providing the electrode layer with improved homogeneity while a press pressure of higher than 7,500 kgf/cm$^2$ tends to break the electrode plate itself including the collector for the electricity storage device.

In the electrode plate according to the present invention for the electricity storage device, said electrode plate being obtainable as described above, the undercoat layer is formed and arranged between the collector and the electrode layer. This undercoat layer is comprised of the appropriately-dispersed conductive material, and as a resin binder, the vinyl carboxylate copolymer crosslinked with the polymeric acid, is excellent in adhesiveness, oxidation-resistant reducing properties and solvent resistance, and has excellent flexibility. The undercoat layer is equipped with characteristics as described above.

(4) Electricity Storage Device

The use of electrode plates (positive electrode plate and negative electrode plate, or polarizable electrode plates) according to the present invention for an electricity storage device makes it possible to manufacture a secondary cell such as a nonaqueous electrolyte secondary cell or a capacitor such as an electric double-layer capacitor or lithium ion capacitor. Therefore, the electricity storage device according to the present invention is provided with the above-mentioned electrode plates for the electricity storage device. The electrode plates according to the present invention, which make up the electricity storage device, provide an improved adhesion force between the corresponding collectors and electrode layers, and therefore, can avoid deteriorations in battery characteristics, which would otherwise occur due to separations during use. Moreover, the resistance between each collector and its corresponding electrode layer is reduced so that high-rate charge and discharge is feasible. It is to be noted that between the surface of each collector and its associated conductive coating film, an electrochemically-stable, interfacial bonding state is formed. It is, therefore, possible to avoid deteriorations in battery characteristics, said deteriorations being associated with an electrolysis, when the cell repeats a multiplicity of charge-discharge cycles over a long term or is left over in a charged state at high temperatures.

The electricity storage device according to the present invention is low in internal resistance, and separations hardly occur between the collectors and the associated electrode layers. It is, therefore, possible to pass a large current and to perform fast charge and discharge. As each conductive coating film is chemically bonded to the surface of its corresponding collector, it is possible to inhibit an increase in resistance value, which would otherwise occur due to interfacial deteriorations. Further, reductions in battery characteristics after a long-term reliability test such as a charge-discharge test or a storage life test are small. In particular, silicon atoms are directly bonded to backbone carbon atoms in the vinyl carboxylate copolymer contained in the coating formulation to be used to form conductive coating films. The vinyl carboxylate copolymer, therefore, forms covalent bonds with polar substituent groups (for example, hydroxyl groups) existing on the surfaces of the collectors. The resulting conductive coating films are, therefore, excellent in adhesiveness to the surfaces of the collectors and also excellent in electrochemical durability. Further, the polymeric acid contained in the coating formulation forms crosslinks between hydroxyl groups themselves in the vinyl carboxylate copolymer and between such hydroxyl groups and hydroxyl groups on the surfaces of the collectors, and therefore, has an effect to make the resulting conductive coating films more resistant to electrochemical degradation.

(Secondary Cell)

When manufacturing, for example, a lithium-based, non-aqueous lithium ion cell, a nonaqueous electrolyte with a lithium salt dissolved as a solute in an organic solvent or ionic liquid is used. Specific examples of the lithium salt include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2CF_7$, $LiOSO_2C_4F_9$, $LiOSO_2C_5F_{11}$, $LiOSO_2C_6F_{13}$ and $LiOSO_2C_7F_{15}$.

Examples of the organic solvent include cyclic esters, linear esters, cyclic ethers, and linear ethers. Illustrative of the cyclic esters are ethylene carbonate, propylene carbonate, butylene carbonate, γ-butyrolactone, vinylene carbonate, 2-methyl-γ-butyrolactone, acetyl-γ-butyrolactone, and γ-valerolactone.

Illustrative of the linear esters are dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates.

Illustrative of the cyclic ethers are tetrahydrofuran, alkyltetrahydrofurans, dialkylalkyltetrahydrofurans, alkoxytetrahydrofurans, dialkoxytetrahydrofurans, 1,3-dioxolane, alkyl-1,3-dioxolanes, and 1,4-dioxolane. Illustrative of the linear ethers are 1,2-dimethoxyethane, 1,2-diethoxyethane, diethyl ether, ethylene glycol dialkyl ethers, diethylene glycol dialkyl ethers, triethylene glycol dialkyl ethers, and tetraethylene glycol dialkyl ethers.

The ionic liquid is a liquid formed solely of ions consisting of organic cations and anions in combination. Examples of the organic cations include dialkylimidazolium cations such as 1-ethyl-3-methylimidazolium ions; trialkylimidazolium cations such as 1,2-dimethyl-3-propylimidazolium ions; tetraalkylammonium ions such as dimethylethylmethoxyammonium ions; alkylpyridinium ions such as 1-butylpyridinium ions; dialkylpyrrolidinium ions such as methyl propyl pyrrolidinium ions; and dialkylpiperidinium ions such as methylpropylpiperidinium ions. These kinds of organic cations can be used either singly or as a combination of two or more thereof.

Examples of the anions to be paired with these organic cations include $AlCl_4^-$, $PF_6^-$; $PF_3(C_2F_5)_3^-$, $PF_3(CF_3)_3^-$, $BF_4^-$, $BF_2(CF_3)_2^-$, $BF_3(CF_3)^-$, $CF_3SO_3^-$ (TfO: triflate anions), $(CF_3SO_2)_2N^-$ (TFSI: trifluoromethanesulfonyl), $(FSO_2)_2N^-$ (FSI: fluorosulfonyl), $(CF_3SO_2)_3C^-$ (TFSM), and the like. It is to be noted that the remaining construction of the secondary cell is the same as in the conventionally-known secondary cells.

(Capacitor)

In the conductive coating film that makes up the polarizable electrode plate for the capacitor, the vinyl carboxylate copolymer, polymeric acid and conductive material are contained. In the coating formulation to be used upon manufacture of the polarizable electrode plate, the content of the vinyl carboxylate copolymer may be preferably from 1 to 40 parts by mass, more preferably from 1 to 20 parts by mass, particularly preferably from 1 to 10 parts by mass in terms of solids content per 100 parts by mass of the coating formulation. An unduly low content of the vinyl carboxylate copolymer may make the components of the conductive coating film easier to fall off from the conductive coating film, while an excessively high content of the vinyl carboxylate copolymer may cover the conductive material with the vinyl carboxylate copolymer to provide the resulting polarizable electrode plate with an increased internal resistance.

As the polymeric acid, one containing acidic groups such as carboxyl groups or phosphoric groups at a high content from the standpoint of crosslinkability for the vinyl carboxylate copolymer. The amount of the polymeric acid contained in the coating formulation may be preferably from 100 to 1,000 parts by mass, with from 100 to 500 parts by mass being more preferred, per 100 parts by mass of the vinyl carboxylate copolymer. If the content of the polymeric acid is lower than 100 parts by mass, the resulting conductive coating film may be provided with insufficient adhesiveness to the collector and also with insufficient electrolyte resistance. On the other hand, if the content of the polymeric acid exceeds 1,000 parts by mass, on the other hand, the insolubility and non-swellability of the resulting crosslinked product (crosslinked polymer) of the vinyl carboxylate copolymer in the electrolyte tend to drop and the economy also tends to become disadvantageous.

Preferred examples of the conductive material, which is to be incorporated in the coating formulation to be used upon production of the polarizable electrode plates for the capacitor, include conductive carbons such as acetylene black, Ketjenblack, carbon black, carbon nanofibers and carbon nanotubes. The use of such a conductive material can provide the resulting conductive coating film with still improved electrical contact and to provide the capacitor with a reduced internal resistance and an increased capacity density. The amount of the conductive material contained in the coating formulation may be preferably from 0.1 to 30 parts by mass, more preferably from 2 to 15 parts by mass per 100 parts by mass of the coating formulation.

The coating formulation to be used upon production of the electrode plates for the capacitor may be preferably subjected to processing by a physical processing method before its application as needed. Examples of the physical processing method include processing methods that make use of a bead mill, ball mill, sand mill, pigment disperser, mix-muller, ultrasonic disperser, homogenizer, planetary mixer, Hobart mixer, and the like, respectively. Also preferred is a method that upon mixing the respective components, first mixes the conductive material by using a mixer such as a mix-muller, planetary mixer, Henschel mixer or omni-mixer, adds a solution of the vinyl carboxylate copolymer and polymeric acid, and then mixes them until homogeneous. The adoption of this method can readily obtain a homogeneous coating formulation. The use of such a homogeneous coating formulation makes it possible to obtain polarizable electrode plates of still better characteristics for a capacitor.

As the material making up the collector, a material having electrical conductivity and electrochemical durability is preferred. Especially from the viewpoint of heat resistance, a collector made of a metal material such as aluminum, titanium, tantalum, stainless steel, gold or platinum is preferred, with a collector made of aluminum or platinum being more preferred. No particular limitation is imposed on the shape of the collector. In general, however, a sheet-shaped collector having a thickness of from 0.001 to 0.5 mm or so can be employed.

By applying the coating formulation onto the surface of the collector and then drying the thus-applied coating formulation, the conductive coating film can be formed. As an application method of the coating formulation, doctor blade coating, dip coating, reverse roll coating, direct roll coating, gravure coating, extrusion coating, brush coating, spray coating or the like can be mentioned.

The viscosity of the coating formulation may be generally from 10 to 100,000 mPa·s, preferably from 50 to 50,000 mPa·s, more preferably from 100 to 20,000 mPa·s, although it differs depending on the type of the coating machine and the layout of the coating line. No particular limitation is imposed on the amount of the coating formulation to be applied. In general, however, the coating formulation may be applied in such an amount that a coating film layer to be formed subsequent to the removal of the polar solvent by drying will have a thickness of usually from 0.05 to 100 μm, preferably from 0.1 to 10 μm. It is to be noted that the drying method, drying conditions and the like are as in the production of the electrode plates for the cells.

The electric double-layer capacitor or lithium ion capacitor can be manufactured in a usual manner by using parts such as the above-described polarizable electrode plates, electrolyte and separator. Described specifically, a stack, which has been obtained by stacking the polarizable electrode plates via the separator, is rolled or folded into a form conforming to a capacitor, and is then placed in a can. By subsequently filling the electrolyte into the can and sealing the can, the capacitor can be manufactured.

The electrolyte may preferably be a nonaqueous electrolyte which is obtained by dissolving an electrolyte in an organic solvent. As an electrolyte for an electric double-layer capacitor, any electrolyte known to date can be used. Specific examples of such an electrolyte include tetraethylammonium tetrafluoroborate, triethylmonomethylammonium tetrafluoroborate, tetraethylammonium hexafluorophosphate, and the like. Specific examples of an electrolyte for a lithium ion capacitor, on the other hand, include lithium salts such as LiI, $LiClO_4$, $LiAsF_6$, $LiBF_4$, $LiPF_6$, and the like.

No particular limitation is imposed on the organic solvent (electrolyte solvent) for dissolving such an electrolyte, insofar as it is commonly employed as an electrolyte solvent. Specific examples of the electrolyte solvent include carbonates such as propylene carbonate, ethylene carbonate and butylene carbonate; lactones such as γ-butyrolactone; sulfolanes; and nitriles such as acetonitrile. These electrolyte solvents can be used either singly or as a combination of two or more thereof. Among these, carbonates are preferred for their high withstand voltage. The concentration of the electrolyte may be generally 0.5 mol/L or higher, preferably 0.8 mol/L or higher.

As the separator, a known separator can be used such as a microporous membrane or nonwoven fabric made of a polyolefin such as polyethylene or polypropylene; or a porous membrane made of pulp as a primary raw material and generally called "electrolytic capacitor paper". The separator may also be formed by dispersing an inorganic ceramic powder and a resin binder in a solvent, coating the resultant dispersion onto an electrode layer, and then drying the thus-coated dispersion. A solid electrolyte or gel electrolyte may also be used instead of the separator. As other materials of the can and the like, those employed in usual capacitors are all usable.

EXAMPLES

The present invention will next be described more specifically based on examples, although the present invention shall not be limited by these examples. It is to be noted that all designations of "parts" or "%" in the following examples are on a mass basis unless otherwise specifically indicated.

(1) Synthesis of Vinyl Carboxylate Copolymers A to E (Vinyl Carboxylate Copolymer A)

Into a 10-L three-necked flask fitted with a condenser, methanol (1,000 parts), vinyl acetate (1,400 parts) and vinyltriethoxysilane (50 parts) were added. Under stirring, the flask was purged with dry argon and was heated to 60° C. Into the flask, a 3.5% solution (1,200 parts) of 2,2'-azobisisobutyronitrile in methanol was added dropwise. Polymerization was then conducted while dropwise adding a 10% solution (100 parts) of vinyltriethoxysilane in methanol over 5 hours. Methanol vapor was introduced to remove unreacted vinyl acetate. Into the flask, a 10% solution (100 parts) of sodium hydroxide in methanol was added dropwise at 40° C. under stirring. The resulting white gel was ground, washed with methanol to remove unreacted vinyltriethoxysilane, and then dried to obtain the vinyl carboxylate copolymer A. As a result of an elemental analysis of the resultant vinyl carboxylate copolymer A by ICP-AES (Inductively Coupled Plasma Atomic Emission Spectroscopy), it was found that vinyisilane units were contained at 1 mol % and 99% of vinylcarboxylate moieties had been saponified. The molecular weight was measured by GPC (Gel Permeation Chromatography), and m/n, m and n were determined to be 0.01, 10 and 990, respectively.

(Vinyl Carboxylate Copolymer B)

Into a 10-L three-necked flask fitted with a condenser, methanol (1,200 parts), vinyl acetate (1,400 parts) and vinyltriethoxysilane (200 parts) were added. Under stirring, the flask was purged with dry argon and was heated to 60° C. Into the flask, a 3.7% solution (1,300 parts) of 2,2'-azobisisobutyronitrile in methanol was added dropwise. Polymerization was then conducted while dropwise adding a 10% solution (200 parts) of vinyltriethoxysilane in methanol over 5 hours. Methanol vapor was introduced to remove unreacted vinyl acetate. Into the flask, a 10% solution (150 parts) of sodium hydroxide in methanol was added dropwise at 40° C. under stirring. The resulting white gel was ground, washed with methanol to remove unreacted vinyltriethoxysilane, and then dried to obtain the vinyl carboxylate copolymer B. As a result of an elemental analysis of the resultant vinyl carboxylate copolymer B by ICP-AES, it was found that vinylsilane units were contained at 2.5 mol % and 99% of vinylcarboxylate moieties had been saponified. The molecular weight was measured by GPC, and m/n, m and n were determined to be 0.026, 25 and 975, respectively.

(Vinyl Carboxylate Copolymer C)

Into a 10-L three-necked flask fitted with a condenser, methanol (1,000 parts), vinyl acetate (1,400 parts) and vinyltriethoxysilane (50 parts) were added. Under stirring, the flask was purged with dry argon and was heated to 60° C. Into the flask, a 3.5% solution (1,200 parts) of 2,2'-azobisisobutyronitrile in methanol was added dropwise. Polymerization was then conducted while dropwise adding a 10% solution (100 parts) of vinyltriethoxysilane in methanol over 5 hours. Methanol vapor was introduced to remove unreacted vinyl acetate. Into the flask, a 10% solution (60 parts) of sodium hydroxide in methanol was added dropwise at 40° C. under stirring. The resulting white gel was ground, washed with methanol to remove unreacted vinyltriethoxysilane, and then dried to obtain the vinyl carboxylate copolymer C. As a result of an elemental analysis of the resultant vinyl carboxylate copolymer C by ICP-AES, it was found that vinylsilane units were contained at 1 mol % and 75% of vinylcarboxylate moieties had been saponified. The molecular weight was measured by GPC, and m/n, m and n were determined to be 0.01, 10 and 990, respectively.

(Vinyl Carboxylate Copolymer D)

Into a 10-L three-necked flask fitted with a condenser, methanol (1,000 parts), vinyl acetate (1,400 parts) and vinyltriethoxysilane (50 parts) were added. Under stirring, the flask was purged with dry argon and was heated to 60° C. Into the flask, a 3.5% solution (1,200 parts) of 2,2'-azobisisobutyronitrile in methanol was added dropwise. Polymerization was then conducted while dropwise adding a 10% solution (100 parts) of vinyltriethoxysilane in methanol over 5 hours. Methanol vapor was introduced to remove unreacted vinyl acetate. Into the flask, a 5% solution (250 parts) of lithium hydroxide in methanol was added dropwise at 40° C. under stirring. Subsequent to the completion of the dropwise addition, stirring was conducted at 60° C. for 5 hours. The resulting white gel was ground, washed with methanol to remove unreacted vinyltriethoxysilane, and then dried to obtain the vinyl carboxylate copolymer D in a Li salt form. As a result of an elemental analysis of the resultant vinyl carboxylate copolymer D by ICP-AES, it was found that lithium was contained at 5%, vinylsilane units were contained at 1 mol % and 98% of vinylcarboxylate moieties had been saponified. The molecular weight was measured by GPC, and m/n, m and n were determined to be 0.01, 10 and 990, respectively.

(Vinyl Carboxylate Copolymer E)

The vinyl carboxylate copolymer A (100 parts) was dissolved under heat at 80° C. for 12 hours in deionized water (9,900 parts), and the resulting solution was then allowed to cool to room temperature. To the solution, tetraethylammonium chloride (5 parts) was added, followed by stirring for 30 minutes. To the solution so obtained, an ion-exchange resin ("AMP01", trade name; product of Mitsubishi Chemical Corporation) (500 parts) was added, followed by stirring for 12 hours. After the ion-exchange resin was removed, water was driven off by reduced-pressure distillation to obtain the vinyl carboxylate copolymer E in a tetraethylamine salt form. In the resultant vinyl carboxylate copolymer E, 70% of the sodium atoms in the vinyl carboxylate copolymer A used as a raw material had been substituted by tetraethylammonium groups.

(2) Preparation of Coating Formulations

Example 1

Acetylene black (5 parts) was added to a 12.5% aqueous solution (40 parts) of polyacrylic acid. The resulting mixture was stirred and mixed in a dissolver, and was then subjected to dispersion processing for 1 hour in a bead mill (zirconia beads of 0.8 mm in diameter, filling ratio: 70%) to obtain a dispersion. To the dispersion so obtained, the vinyl carboxylate copolymer A (5 parts) and deionized water (50 parts) were added, followed by stirring and mixing for 30 minutes to prepare a coating formulation. It is to be noted that as the aqueous solution of polyacrylic acid, "JURYMER AQUEOUS SOLUTION AC-10S" (trade name, product of Toagosei Co., Ltd.; Mw: 5,000) was used.

Examples 2 to 12, Comparative Examples 1 and 2

Coating formulations were prepared as in the above-mentioned Example 1 except that the addition of the individual components was set as shown in Table 1. The meanings of the abbreviations in Table 1 are as shown hereinafter.
AB: Acetylene black
KB: Ketjenblack
FB: Furnace black
CNT: Carbon nanotubes
PMA: Pyromellitic acid
TMA: Trimellitic acid
MeOH: Methyl alcohol
IPA: Isopropyl alcohol
NMP: N-methyl-2-pyrrolidone

TABLE 1

Preparation of Coating Formulations

| | Polymeric acid | | Resin binder | | Conductive material | | Crosslinking agent | | Solvent | |
|---|---|---|---|---|---|---|---|---|---|---|
| | Kind | parts | Kind | parts | Kind | parts | Kind | parts | Kind | parts |
| Ex. 1 | Polyacrylic acid | 5 | Vinyl carboxylate copolymer A | 5 | AB | 5 | | | Water | 85 |
| Ex. 2 | Polyacrylic acid | 5 | Vinyl carboxylate copolymer B | 5 | AB | 5 | | | Water | 85 |
| Ex. 3 | Polyacrylic acid | 5 | Vinyl carboxylate copolymer C | 5 | AB | 5 | | | Water | 85 |
| Ex. 4 | Polyacrylic acid | 5 | Vinyl carboxylate copolymer D | 5 | AB | 5 | | | Water | 85 |
| Ex. 5 | Polyacrylic acid | 5 | Vinyl carboxylate copolymer E | 5 | AB | 5 | | | Water | 85 |
| Ex. 6 | Polyitaconic acid | 3 | Vinyl carboxylate copolymer A | 7 | KB | 4 | | | Water/IPA = 9/1 | 86 |
| Ex. 7 | Polymaleic acid | 5 | Vinyl carboxylate copolymer A | 4 | FB | 7 | | | Water/MeOH = 8/2 | 84 |
| Ex. 8 | Polyacrylic acid | 5 | Vinyl carboxylate copolymer B | 5 | CNT | 3 | | | Water/NMP = 5/5 | 87 |
| Ex. 9 | Polyacrylic acid | 7 | Vinyl carboxylate copolymer C | 5 | AB | 10 | TMA | 1 | Water | 77 |
| Ex. 10 | Polyacrylic acid | 5 | Vinyl carboxylate copolymer D | 5 | AB | 8 | PMA | 1 | Water | 81 |
| Ex. 11 | Polyacrylic acid | 10 | Vinyl carboxylate copolymer A | 5 | AB | 10 | | | Water | 75 |
| Ex. 12 | Polyacrylic acid | 5 | Vinyl carboxylate copolymer A | 10 | AB | 10 | | | Water | 75 |
| Comp. Ex. 1 | Polyacrylic acid | 5 | | | AB | 5 | | | Water | 90 |
| Comp. Ex. 2 | | | Vinyl carboxylate copolymer A | 5 | AB | 5 | | | Water | 90 |

(3) Formation of Conductive Coating Films

Example 13

Using a comma roll coater, the coating formulation of Example 1 was applied onto one side of an aluminum foil (collector) of 20 μm in thickness. Using an oven, the thus-coated collector was subjected to heat treatment at 110° C. for 2 minutes and then to further heat treatment at 180° C. for 2 minutes. As a result, the solvent was removed and the polymer component was crosslinked, so that a conductive coating film was formed with a dry film thickness of 1 μm on the collector.

Examples 14 to 24, Comparative Examples 3 to 5

Conductive coating films were formed on collectors as in the above-mentioned Example 13 except that the coating formulations shown in Table 2 were used. It is to be noted that Comparative Example 5 used a coating formulation (which is referred to as "PVDF solution" in Table 2 for the sake of convenience) obtained by dispersing acetylene black (5 parts) in a solution (5 parts) of polyvinylidene fluoride in NMP.
Evaluation of Adhesiveness Parallel lines, which consisted of perpendicularly-intersecting 11 vertical lines and 11 horizontal lines, were drawn by a cutter at intervals of 1 mm on each formed conductive coating film so that 100 squares were formed within 1 cm². A mending tape was applied onto the squares, and then peeled off. The number of squares which were not peeled off without adhesion to the mending tape was counted. The average of 10 tests was calculated. The results are shown in Table 2. It is to be noted that the number of squares which were not peeled off was employed as an index of adhesiveness of the conductive coating film to the collector.
Evaluation of Electrolyte Resistance In a LiPF$_6$ solution (electrolyte) obtained by dissolving LiPF$_6$ (1 mol) as a support salt in a 1:1:2 (volume ratio) mixed solvent (1 L) of ethylene carbonate, propylene carbonate and dimethoxyethane, each conductive coating film with squares formed by similar procedure as described above was immersed at 70° C. for 72 hours. The conditions of the conductive coating film after the immersion were visually observed, and the electrolyte resistance (solubility/swellability) of the conductive coating film was evaluated according to the below-described standards. The results are shown in Table 2.

A: None of dissolution, swelling and separation is observed.
  B: Slightly swollen, but no separation is observed.
  C: Dissolved or swollen, and moreover, separation is observed.

Evaluation of Oxidation Resistance

Each conductive coating film was immersed in a 6% aqueous solution of hydrogen peroxide. After subjected to heat treatment at 80° C. for 3 hours, the conductive coating film was rinsed with water and dried in air. The surface of the conductive coating film (dry coating film) was rubbed by an index finger ball, and the oxidation resistance of the conductive coating film was evaluated according to the below-described standards. The results are shown in Table 2.

A: No separation is observed after the heat treatment, no separation takes place even when the surface of a dry coating film is strongly rubbed by an index finger ball, and carbon on the surface does not fall off either.
  B: No separation is observed after the heat treatment, and no separation takes place even when the surface of a dry coating film is strongly rubbed by an index finger ball. However, carbon on the surface falls off a little.
  C: Separation takes place after the heat treatment, or no separation takes place after the heat treatment but separation occurs when the surface of a dry coat film is strongly rubbed by an index finger ball.

Measurement of Surface Resistivity

After each coating formulation shown in Table 2 was applied onto a glass plate by using a comma roll coater, the thus-coated glass plate was subjected to heat treatment at 200° C. for 1 minute to form a conductive coating film (dry film thickness: 4 μm) on the glass plate. Following JIS K 7194, the surface resistivity of the thus-formed conductive coating film was measured by the four-point probe method. It is to be noted that "LORESTA-GP MODEL: MCP-T610" (trade name, manufactured by Mitsubishi Chemical Analytech Co., Ltd.) was used for the measurement. The measurement was conducted under the conditions of 25° C. and 60% relative humidity.

(4) Manufacture of Cells

Examples 25 to 29, Comparative Example 6

In each of Examples 25 to 29 and Comparative Example 6, a lithium ion secondary cell was manufactured using the corresponding coating formulation, which contained the corresponding vinyl carboxylate copolymer, polycarboxylic acid and conductive material, and was evaluated. A description will be made of its manufacturing process and evaluation methods.

Test 1

On the lithium ion secondary cells manufactured in the below-described examples and comparative example, the following characteristics were measured.

Initial Capacity

To provide each lithium ion secondary cell with an initial capacity, the cell was charged at a constant current of 0.01 mA until 4.3V was reached, and was then charged at a constant voltage of 4.3 V for 2 hours. Subsequently, the cell was discharged at a constant current of 0.01 mA until the voltage dropped to 3 V. That charge-discharge cycle was repeated 3 times, and the discharge capacity in the third charge-discharge cycle was recorded as the initial capacity.

Initial Internal Resistance

Each cell after the measurement of its initial capacity was held at a potential of 4.3 V, and as its initial internal resistance, the impedance was measured at 1 kHz with voltage changes of ±10 mV from the potential as a center.

Rate Characteristics

From the initial capacity of each lithium ion secondary cell, discharge rates were determined. At those different discharge rates, the discharge capacity was measured. After the voltage was raised at a constant current to 4.3 V over 10 hours each time, the cell was charged at a constant voltage of 4.3 V for 2 hours. Subsequently, the cell was discharged at a constant current over 10 hours until 3 V was reached, and the discharge capacity at that time was recorded as a discharge capacity at 0.1 C. After the cell was similarly charged, the cell was discharged at a current value that a discharge would be com

TABLE 2

Formation and Evaluation of Conductive Coating Films

|  | Coating formulation | Number of squares remained unseparated (average value) | Electrolyte resistance | Oxidation resistance | Surface resistivity (×10³ Ω/□) |
|---|---|---|---|---|---|
| Ex. 13 | Ex. 1 | 99 | A | A | 1.7 |
| Ex. 14 | Ex. 2 | 100 | A | A | 1.5 |
| Ex. 15 | Ex. 3 | 100 | A | A | 1.6 |
| Ex. 16 | Ex. 4 | 100 | A | A | 1.6 |
| Ex. 17 | Ex. 5 | 100 | A | A | 1.7 |
| Ex. 18 | Ex. 6 | 100 | B | B | 1.8 |
| Ex. 19 | Ex. 7 | 98 | A | A | 1.3 |
| Ex. 20 | Ex. 8 | 100 | A | A | 1.2 |
| Ex. 21 | Ex. 9 | 99 | A | A | 0.8 |
| Ex. 22 | Ex. 10 | 100 | A | A | 0.9 |
| Ex. 23 | Ex. 11 | 99 | A | A | 1.1 |
| Ex. 24 | Ex. 12 | 100 | A | A | 1.0 |
| Comp. Ex. 3 | Comp. Ex. 1 | 95 | C | A | 0.8 |
| Comp. Ex. 4 | Comp. Ex. 2 | 93 | C | B | 0.7 |
| Comp. Ex. 5 | PVDF soln. | 64 | B | C | 1.9 | pleted in 1 hour from the discharge capacity determined at 0.1 C. At that time, the discharge capacity was determined and was recorded as a discharge capacity at 1 C. Similarly, the discharge capacity was determined at 3 C, 10 C and 30 C, respectively. Assuming that the discharge capacity at 0.1 C was 100%, the capacity retention rates were calculated.

Cycle Life

On each lithium ion secondary cell, a charge-discharge test was performed, in which the cell was charged at 1 C to 4.3 V and subsequent to the charging at a constant voltage of 4.3 V for 2 hours, the cell was discharged at 1 C. At that time, a calculation was made as to what percent of the discharge capacity in the first discharge was the discharge capacity. The charge-discharge cycle in which the capacity fell below 80% was recorded as its life.

Float Test

Each lithium ion secondary cell was charged at 60° C. and 0.1 C to 4.3 V, and the change in impedance at a constant voltage of 4.3 V was measured approximately on alternate days. The time at which the resistance value became doubled was recorded as its life.

Separation Test on Electrodes after Durability Test

Each cell was subjected to a 1,000-cycle charge-discharge durability test under the above-described conditions for cycle life, and the cell was then disassembled to confirm whether or not the active material layers separated from the positive electrode and negative electrode after the durability test. Evaluation standards are as follows.

A: No separation is observed at all.
B: Separation has proceeded, and the collectors are partly exposed.
C: Active material layers have separated completely.

Production of Collectors with Conductive Coating Films Formed Thereon

Using aluminum foils for positive electrodes and copper foils for negative electrodes, conductive coating films were formed on their surfaces, respectively, by a similar process as in Examples 13 to 17 and Comparative Example 5.

Production of Positive Electrodes

Into a 10-L planetary mixer equipped with a cooling jacket, a 15% solution (600 parts) of PVDF in NMP ("KUREHA KF POLYMER #1120" (trade name; product of Kureha Corporation), lithium cobaltate ("C-5H", trade name; product of Nippon Chemical Industrial Co., Ltd.) (90 parts), acetylene black ("DENKA BLACK HS-100", trade name; product of Denki Kagaku Kogyo Kabushiki Kaisha) (100 parts), and NMP (5,000 parts) were added. The resulting mixture was stirred until homogeneous while cooling it such that the temperature of the mixture would not rise beyond 30° C. The thus-prepared mixture was coated to a width of 180 mm at a thickness of 200 µm on each collector with its corresponding conductive coating film formed thereon, followed by drying for 20 seconds in a hot-air furnace controlled at 160° C. The thus-coated collector was roll-pressed under a linear pressure of 400 kgf/cm. The thickness of the positive electrode active material layer after the pressing was 21 µm.

Production of Negative Electrodes

Into a 10-L planetary mixer equipped with a cooling jacket, a 15% solution (600 parts) of PVDF in NMP ("KUREHA KF POLYMER #9130" (trade name; product of Kureha Corporation), graphite ("CGB-200", trade name; product of Nippon Graphite industries Ltd.) (1,200 parts), and NMP (4,000 parts) were added. The resulting mixture was stirred until homogeneous while cooling it such that the temperature of the mixture would not rise beyond 30° C. The thus-prepared mixture was coated to a width of 180 mm at a thickness of 200 µm on each collector with its corresponding conductive coating film formed thereon, followed by drying for 2 minutes in a hot-air furnace controlled at 120° C. The thus-coated collector was roll-pressed under a linear pressure of 400 kgf/cm. The thickness of the negative electrode active material layer after the pressing was 26 µm.

Manufacture of Lithium Ion Secondary Cells

Each positive electrode and its associated negative electrode were cut in 40 mm×50 mm such that regions free of the corresponding active material layers were included over 10 mm wide along short sides thereof, respectively. To the parts where the corresponding metals were exposed, an aluminum tab (for the positive electrode) and a nickel tab (for the negative electrode) were joined by resistance welding. A separator ("#2400", trade name; product of Selgard K.K.) was cut 45 mm wide and 120 mm long. The thus-cut separator was folded back into three, between which the positive electrode and negative electrode were held, respectively, such that they are located opposite to each other. The resulting stacked cell unit was held in an aluminum laminate sheet having a 50 mm width and 100 mm length and folded in two. A sealant was held between tab-contacting parts of the aluminum laminate sheet. The aluminum laminate sheet was then thermally laminated at its parts, between which the sealant was held, and its sides, which were perpendicular to the parts, into the form of a bag. The bagged cell was held for 12 hours in a vacuum oven controlled at 100° C., so that the bagged cell was dried under vacuum. In a dry glove box, a 1 M electrolyte of lithium hexafluorophosphate in a 1:1 mixed solvent of EC (ethylene chloride) and DEC (diethyl carbonate) ("LBG-96533", trade name; product of Kishida Chemical Co., Ltd.) was injected into the bagged cell to conduct vacuum impregnation. Any extra electrolyte was then squeezed out, and the bagged cell was joined and sealed by a vacuum sealer to manufacture a lithium ion cell.

TABLE 3-1

Manufacture and Evaluation of Cells

| | Positive electrode plate | Negative electrode plate | |
|---|---|---|---|
| | Conductive coating film | Coating formulation | Collector |
| Ex. 25 | Ex. 13 | Ex. 1 | Copper foil |
| Ex. 26 | Ex. 14 | Ex. 2 | Copper foil |
| Ex. 27 | Ex. 15 | Ex. 3 | Copper foil |
| Ex. 28 | Ex. 16 | Ex. 4 | Copper foil |
| Ex. 29 | Ex. 17 | Ex. 5 | Copper foil |
| Comp. Ex. 6 | Comp. Ex. 5 | PVDF soln. | Copper foil |

TABLE 3-2

Manufacture and Evaluation of Cells

|  | Initial capacity (mAh) | Initial internal resistance (Ω) | Capacity retention rate (%) | | | | Cycle life (cycles) | Float life (hrs) | Separation resistance |
|---|---|---|---|---|---|---|---|---|---|
|  |  |  | 1 C | 3 C | 10 C | 30 C |  |  |  |
| Ex. 25 | 10 | 3 | 99 | 91 | 62 | 32 | 530 | 800 | A |
| Ex. 26 | 10 | 3 | 99 | 92 | 63 | 34 | 720 | 1300 | A |
| Ex. 27 | 10 | 3 | 99 | 90 | 59 | 30 | 490 | 710 | B |
| Ex. 28 | 12 | 3 | 99 | 93 | 65 | 37 | 540 | 850 | A |
| Ex. 29 | 10 | 3 | 99 | 90 | 59 | 30 | 490 | 710 | A |
| Comp. Ex. 6 | 7 | 4.5 | 95 | 74 | 45 | 0 | 81 | 45 | C |

(5) Manufacture of Capacitors

Examples 30 to 34, Comparative Example 7

In each of Examples 30 to 34 and Comparative Example 7, an electric double-layer capacitor was manufactured using the corresponding coating formulation, which contained the corresponding vinyl carboxylate copolymer, polycarboxylic acid and conductive material, and was evaluated. A description will be made of its manufacturing process and evaluation methods.

Test 2

On the electric double-layer capacitors manufactured in the below-described examples and comparative example, the following characteristics were measured.

Initial Capacity

To provide each electric double-layer capacitor with an initial capacity, the capacitor was charged at a constant current of 0.01 mA until 2 V was reached. Subsequently, the capacitory was discharged at a constant current of 0.01 mA until the voltage dropped to 0 V. That charge-discharge cycle was repeated 3 times, and the discharge capacity in the third charge-discharge cycle was recorded as the initial capacity.

Initial Internal Resistance

Each cell after the measurement of its initial capacity was held at a potential of 2 V, and as its initial internal resistance, the impedance was measured at 1 kHz with voltage changes of ±10 mV from the potential as a center.

Rate Characteristics

From the initial capacity of each electric double-layer capacitor, discharge rates were determined. At those different discharge rates, the discharge capacity was measured. Charging was conducted by raising the voltage at a constant current to 2 V over 1 hour each time. Subsequently, the capacitor was discharged at a constant current over 1 hour until 0 V was reached, and the discharge capacity at that time was recorded as a discharge capacity at 1 C. After the capacitor was similarly charged, the capacitor was discharged at a current value that a discharge would be completed in 0.1 hour from the discharge capacity determined at 1 C. At that time, the discharge capacity was determined and was recorded as a discharge capacity at 10 C. Similarly, the discharge capacity was determined at 30 C, 100 C and 300 C, respectively. Assuming that the discharge capacity at 1 C was 100%, the capacity retention rates were calculated.

Cycle Life

On each electric double-layer capacitor, a charge-discharge test was performed, in which after charged at 1 C to 2 V, the capacitor was discharged at 1 C to 0 V. At that time, a calculation was made as to what percent of the discharge capacity in the first discharge was the discharge capacity. The charge-discharge cycle in which the capacity fell below 80% was recorded as its life.

Float Test

Each electric double-layer capacitor was charged at 60° C. and 1 C to 2.8 V, and the change in impedance at a constant voltage of 2.8 V was measured approximately on alternate days. The time at which the resistance value became doubled was recorded as its life.

Separation Test on Electrodes after Durability Test

Each cell was subjected to a 3,000-hour durability float test under the above-described conditions for float life, and the electric double-layer capacitor was then disassembled to confirm whether or not the active material layers separated from the electrode collectors after the durability test. Evaluation standards are as follows.

A: No separation is observed at all.
B: Separation has proceeded, and the collectors are partly exposed.
C: Active material layers have separated completely.

Production of Collectors with Conductive Coating Films Formed Thereon

Conductive coating films were formed on surfaces of aluminum foils, respectively, by a similar process as in Examples 13 to 17 and Comparative Example 5.

Production of Electrodes

Into a 10-L planetary mixer equipped with a cooling jacket, a 15% solution (3,000 parts) of PVDF in NMP ("KUREHA KF POLYMER #1120" (trade name; product of Kureha Corporation), activated carbon ("KURARAY COAL RP-20", trade name; product of Kuraray Co., Ltd.) (1,600 parts), and NMP (2,500 parts) were added. The resulting mixture was stirred until homogeneous while cooling it such that the temperature of the mixture would not rise beyond 30° C. The thus-prepared mixture was coated to a width of 180 mm at a thickness of 200 μm on each collector with its corresponding conductive coating film formed thereon, followed by drying for 20 seconds in a hot-air furnace controlled at 160° C. The thus-coated collector was roll-pressed under a linear pressure of 400 kgf/cm. The thickness of the electrode active material layer after the pressing was 21 μm.

Manufacture of Electric Double-Layer Capacitors

Two rectangles of 40 mm×50 mm were cut out from each electrode such that regions free of the corresponding active material layer were included over 10 mm wide along short sides thereof. To parts where the metal was exposed, aluminum tabs were joined by resistance welding, respectively. A separator ("#2400", trade name; product of Selgard K.K.) was cut 45 mm wide and 120 mm long. The thus-cut separator was folded back into three, between which the two electrodes were held, respectively, such that they were located opposite to each other. The resulting stacked capacitor unit was held in an aluminum laminate sheet having a 50 mm width and 100 mm length and folded in two. A sealant was held between tab-contacting parts of the aluminum laminate sheet. The aluminum laminate sheet was then thermally laminated at its parts, between which the sealant was held, and its sides, which were perpendicular to the parts, into the form of a bag.

The bagged capacitor was held for 12 hours in a vacuum oven controlled at 100° C., so that the bagged capacitor was dried under vacuum. In a dry glove box, a 1 M electrolyte of tetraethylammonium borofluoride in PC (propylene carbonate) ("CPG-00005", trade name; product of Kishida Chemical Co., Ltd.) was injected into the bagged capacitor to conduct vacuum impregnation. Any extra electrolyte was then squeezed out, and the bagged capacitor was joined and sealed by a vacuum sealer to manufacture an electric double-layer capacitor.

TABLE 4

Manufacture and Evaluation of Capacitors

| | Coating formulation | Initial capacity (mAh) | Initial internal resistance (Ω) | Capacity retention rate (%) | | | | Cycle life (cycles) | Float life (hrs) | Separation resistance |
|---|---|---|---|---|---|---|---|---|---|---|
| | | | | 10 C | 30 C | 100 C | 300 C | | | |
| Ex. 30 | Ex. 1 | 1.5 | 1.8 | 99 | 97 | 92 | 89 | 3800 | 1100 | A |
| Ex. 31 | Ex. 2 | 1.5 | 1.8 | 99 | 98 | 93 | 91 | 5162 | 1800 | A |
| Ex. 32 | Ex. 3 | 1.5 | 1.8 | 99 | 96 | 88 | 83 | 3500 | 950 | B |
| Ex. 33 | Ex. 4 | 1.5 | 1.8 | 99 | 96 | 88 | 83 | 3500 | 950 | A |
| Ex. 34 | Ex. 5 | 1.7 | 1.6 | 99 | 98 | 95 | 91 | 4500 | 1200 | A |
| Comp. Ex. 7 | PVDF soln. | 1.2 | 4.8 | 98 | 96 | 90 | 86 | 1910 | 49 | C |

INDUSTRIAL APPLICABILITY

The use of the coating formulation according to the present invention makes it possible to form, on a surface of a metal material such as an aluminum material, a conductive coating film having excellent adhesiveness, solvent resistance and oxidation resistance. The conductive coating film so formed is excellent in the adhesiveness to a collector formed of an aluminum foil or copper foil and also in electrolyte resistance, and is also provided with improved contact resistance with the collector. The use of the coating formulation according to the present invention, therefore, makes it possible to produce or manufacture a conductive coating film, a member for an electrode, an electrode plate for an electricity storage device, and the electricity storage device, all of which have superb characteristics.

The invention claimed is:

1. A coating formulation for forming a conductive coating film on a surface of a collector for constructing an electrode plate for an electricity storage device, comprising:

(A) a polymeric acid;

(B) a vinyl carboxylate copolymer represented by the following formula (1):

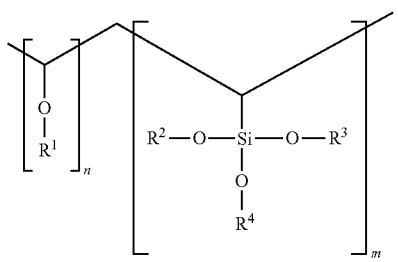

wherein $R^1$ is selected from the group consisting of H, Na, organic groups derived from vinyl carboxylate monomers, and cations capable of forming electrolytes for the electricity storage device, $R^2$ to $R^4$ are independently selected from the group consisting of H, Na, $C_1$-$C_6$ alkyl groups, and cations capable of forming electrolytes for the electricity storage device, and a ratio (m/n) of m to n is from 0.0001 to 1;

(C) a conductive material; and (D) a polar solvent;

wherein a content of the polymeric acid per part by mass of the conductive material is from 0.1 to 3 parts by mass, a content of the vinyl carboxylate copolymer per part by mass of the conductive material is from 0.1 to 3 parts by mass, and a solids concentration is from 0.02 to 40 mass %.

2. The coating formulation according to claim 1, wherein the cation is a lithium or tetraalkylammonium ion.

3. The coating formulation according to claim 1, further comprising a titanium-based coupling agent and/or a silane coupling agent.

4. The coating formulation according to claim 1, wherein the polymeric acid comprises at least one polymeric acid selected from the group consisting of polyacrylic acid, polyitaconic acid, and polymaleic acid.

5. The coating formulation according to claim 1, wherein the conductive material comprises at least one conductive material selected from the group consisting of acetylene black, Ketjenblack, graphite, furnace black, monolayer and multilayer carbon nanofibers, and monolayer and multilayer carbon nanotubes.

6. The coating formulation according to claim 1, further comprising a crosslinking agent.

7. A conductive coating film formed from the coating formulation according to claim 1.

8. The conductive coating film according to claim 7, wherein the film formed from the coating formulation has been formed through heat treatment at from 80 to 250° C., and has a dry film thickness of from 0.1 to 10 μm.

9. The conductive coating film according to claim 7, which has a surface resistivity of not higher than 3,000Ω/□ as measured following JIS K 7194 when formed with a dry film thickness of 4 μm on a glass plate.

10. A member for an electrode plate, comprising a collector and the conductive coating film according to claim 7 as arranged on a surface of the collector.

11. An electrode plate for an electricity storage device, comprising the member according to claim 10 and an electrode active material layer arranged on a surface of the conductive coating film.

12. The electrode plate according to claim 11, wherein the collector is an aluminum foil, and a positive-electrode active material is contained in the electrode active material layer.

13. The electrode plate according to claim 11, wherein the collector is a copper foil, and a negative-electrode active material is contained in the electrode active material layer.

14. The electrode plate according to claim 11, wherein the collector is an aluminum foil, and the electrode plate is a polarizable electrode plate.

15. A process for producing an electrode plate for an electricity storage device, comprising the following steps:
applying the coating formulation according to claim 1 onto a surface of a collector to form a conductive coating film; and
forming an electrode active material layer on a surface of the conductive coating film.

16. The process according to claim 15, wherein after applying the coating formulation onto the surface of the collector, the polar solvent contained in the coating formulation is removed under heat or heat treatment is conducted at from 80 to 250° C. for from 1 second to 60 minutes while removing the polar solvent.

17. An electricity storage device comprising the electrode plate according to claim 11.

18. The electricity storage device according to claim 17, which is a secondary cell or a capacitor.

19. A coating formulation for forming a conductive coating film on a surface of a collector for constructing an electrode plate for an electricity storage device, comprising:
(A) a polymeric acid;
(B) a vinyl carboxylate copolymer represented by the following formula (1):

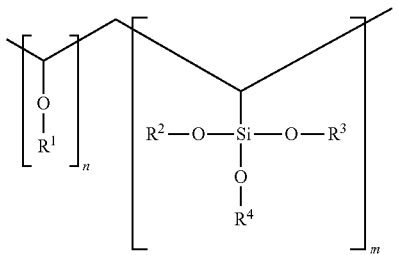

wherein $R^1$ is selected from the group consisting of H, Na, organic groups derived from vinyl carboxylate monomers, and cations capable of forming electrolytes for the electricity storage device, $R^2$ to $R^4$ are independently selected from the group consisting of H, Na, $C_1$-$C_6$ alkyl groups, and cations capable of forming electrolytes for the electricity storage device, and a ratio (m/n) of m to n is from 0.0001 to 1;
(C) a conductive material; and
(D) a polar solvent;
wherein a content of the vinyl carboxylate copolymer per part by mass of the polymeric acid is from 0.1 to 1 parts by mass.

20. The coating formulation according to claim 19, wherein the cation is a lithium or tetraalkylammonium ion.

21. The coating formulation according to claim 19, further comprising a titanium-based coupling agent and/or a silane coupling agent.

22. The coating formulation according to claim 19, wherein the polymeric acid comprises at least one polymeric acid selected from the group consisting of polyacrylic acid, polyitaconic acid, and polymaleic acid.

23. The coating formulation according to claim 19, wherein the conductive material comprises at least one conductive material selected from the group consisting of acetylene black, Ketjenblack, graphite, furnace black, monolayer and multilayer carbon nanofibers, and monolayer and multilayer carbon nanotubes.

24. The coating formulation according to claim 19, wherein a content of the polymeric acid per part by mass of the conductive material is from 0.1 to 3 parts by mass, and a solids concentration is from 0.02 to 40 mass %.

25. The coating formulation according to claim 19, further comprising a crosslinking agent.

26. A conductive coating film formed from the coating formulation according to claim 19.

27. The conductive coating film according to claim 26, wherein the film formed from the coating formulation has been formed through heat treatment at from 80 to 250° C., and has a dry film thickness of from 0.1 to 10 µm.

28. The conductive coating film according to claim 26, which has a surface resistivity of not higher than 3,000Ω/□ as measured following JIS K 7194 when formed with a dry film thickness of 4 µm on a glass plate.

29. A member for an electrode plate, comprising a collector and the conductive coating film according to claim 26 as arranged on a surface of the collector.

30. An electrode plate for an electricity storage device, comprising the member according to claim 29 and an electrode active material layer arranged on a surface of the conductive coating film.

31. The electrode plate according to claim 30, wherein the collector is an aluminum foil, and a positive-electrode active material is contained in the electrode active material layer.

32. The electrode plate according to claim 30, wherein the collector is a copper foil, and a negative-electrode active material is contained in the electrode active material layer.

33. The electrode plate according to claim 30, wherein the collector is an aluminum foil, and the electrode plate is a polarizable electrode plate.

34. A process for producing an electrode plate for an electricity storage device, comprising the following steps:
applying the coating formulation according to claim 19 onto a surface of a collector to form a conductive coating film; and
forming an electrode active material layer on a surface of the conductive coating film.

35. The process according to claim 34, wherein after applying the coating formulation onto the surface of the collector, the polar solvent contained in the coating formulation is removed under heat or heat treatment is conducted at from 80 to 250° C. for from 1 second to 60 minutes while removing the polar solvent.

36. An electricity storage device comprising the electrode plate according to claim 30.

37. The electricity storage device according to claim 36, which is a secondary cell or a capacitor.

* * * * *